US006958841B2

United States Patent
Rancuret et al.

(10) Patent No.: US 6,958,841 B2
(45) Date of Patent: Oct. 25, 2005

(54) GENERATION OF DIGITAL PATTERNS FOR SPATIAL LIGHT MODULATION

(75) Inventors: Paul L. Rancuret, Plano, TX (US); Terry A. Barlett, Dallas, TX (US); Benjamin L. Lee, Duncanville, TX (US); Elisabeth Marley Koontz, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 617 days.

(21) Appl. No.: 10/154,257

(22) Filed: May 23, 2002

(65) Prior Publication Data

US 2003/0001953 A1 Jan. 2, 2003

Related U.S. Application Data

(60) Provisional application No. 60/293,126, filed on May 23, 2001.

(51) Int. Cl.[7] ............................. G02B 26/00; G02F 1/01
(52) U.S. Cl. ...................... 359/239; 359/291; 359/292
(58) Field of Search ................................ 359/238, 290, 359/291, 292

(56) References Cited

U.S. PATENT DOCUMENTS

| 6,055,086 A | 4/2000 | Soutar et al. |
| 2002/0079432 A1 | 6/2002 | Lee et al. |
| 2002/0081070 A1 | 6/2002 | Tew |

*Primary Examiner*—David Spector
(74) *Attorney, Agent, or Firm*—Charles A. Brill; Wade James Brady, III; Frederick J. Telecky, Jr.

(57) ABSTRACT

Disclosed is a method for generating patterns to be used in a spatial light modulator having a plurality of pixels. The method includes generating an optical pattern to be placed upon the pixels of the spatial light modulator, applying the optical pattern to the pixels of the spatial light modulator, measuring the optical performance of the plurality of pixels having the optical pattern applied to it, comparing the measured optical performance to a target optical performance, and adjusting the optical pattern applied to the plurality of pixels to form another optical pattern that more closely achieves the target optical performance.

39 Claims, 13 Drawing Sheets

| 1 | 5 | 9 | 13 | 17 | 21 | 25 | 29 | 33 | 34 | 30 | 26 | 22 | 18 | 14 | 10 | 6 | 2 |
|---|---|---|----|----|----|----|----|----|----|----|----|----|----|----|----|---|---|
| 37 | 41 | 45 | 49 | 53 | 57 | 61 | 65 | 69 | 70 | 66 | 62 | 58 | 54 | 50 | 46 | 42 | 38 |
| | | | | | | | | | | | | | | | | | |
| | | | | | | | | | | | | | | | | | |
| | | | | | | | | | | | | | | | | | |
| | | | | | | | | | | | | | | | | | |
| | | | | | | | | | | | | | | | | | |
| | | | | | | | | | | | | | | | | | |
| | | | | | | | | | | | | | | | | | |
| | | | | | | | | | | | | | | | | | |
| | | | | | | | | | | | | | | | | | |
| | | | | | | | | | | | | | | | | | |
| | | | | | | | | | | | | | | | | | |
| | | | | | | | | | | | | | | | | | |
| 40 | 44 | 48 | 52 | 56 | 60 | 64 | 68 | 72 | 71 | 67 | 63 | 59 | 55 | 51 | 47 | 43 | 39 |
| 4 | 8 | 12 | 16 | 20 | 24 | 28 | 32 | 36 | 35 | 31 | 27 | 23 | 19 | 15 | 11 | 7 | 3 |

| 1 |
|---|
| 3 |
| 5 |
| 7 |
| 9 |
| 11 |
| 13 |
| 15 |
| 17 |
| 19 |
| 21 |
| 22 |
| 20 |
| 18 |
| 16 |
| 14 |
| 12 |
| 10 |
| 8 |
| 6 |
| 4 |
| 2 |

OR

OR

OR

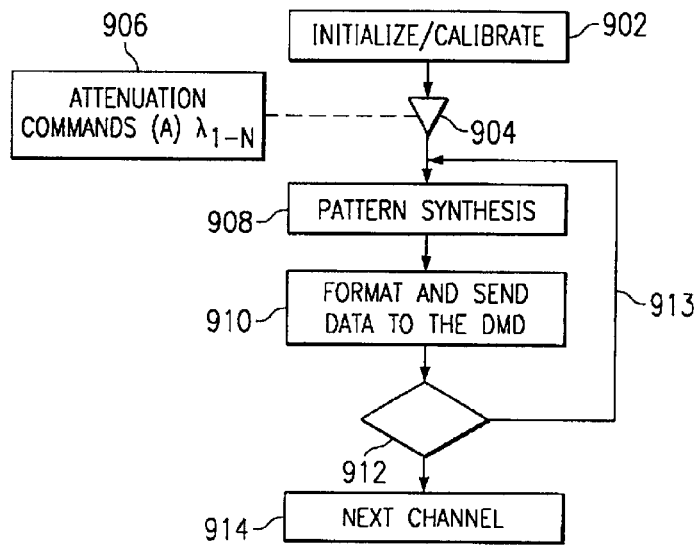
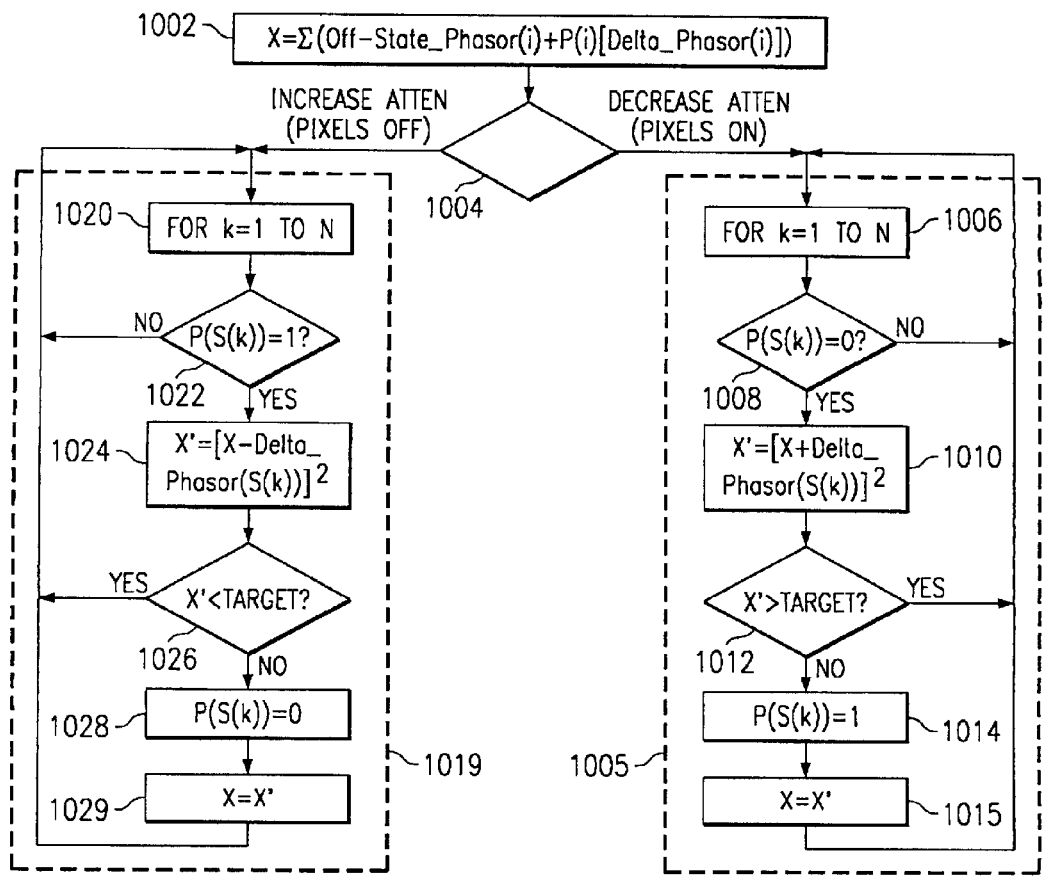

GENERATION OF DIGITAL PATTERNS FOR SPATIAL LIGHT MODULATION

RELATED APPLICATIONS

This application depends from and claims priority to U.S. Provisional Patent Application No. 60/293,126, filed May 23, 2001, which is hereby incorporated by reference herein.

REFERENCE TO APPENDIX

Attached to this application is Appendix I, which is an exemplary compilation of patterns for an embodiment of a spatial light modulator.

TECHNICAL FIELD

Described in this application are patterns and methods for generating patterns for the modulation of optical signals using a pixel-based spatial light modulator.

BACKGROUND

A pixel-based Spatial Light Modulator ("SLM") can be used to modulate an incoming light signal. SLMs can be used in many contexts, such as in projection displays, printing, telecommunications, and in other types of light processing. In a telecommunications context, an incoming light signal can have multiple different channels or carrier wavelengths. In these contexts, differing patterns of pixels are used to achieve differing desired performance characteristics of the modulated light signal. A challenge, however, is to determine the pixel patterns, from all the possible pixel patterns, to be used to achieve the desired optical performance characteristics.

SUMMARY

This application describes embodiments for determining pixel patterns to be used or applied in a pixel-based SLM to achieve certain optical response characteristics. This application further describes embodiments for tuning the optical response characteristics of SLMs and sub-arrays of pixels in SLMs. One optical response being characterized in the embodiments described in this application is that of optical attenuation, but other optical response characteristics also may be accommodated. For example, pixel patterns could also be chosen for their phase effects on the incoming optical signal or on the patterns' abilities to spatially separate or switch incoming optical signals.

In one approach, the optical response of each individual pixel within certain segments of the SLM is determined. Using that information, it can be determined which pixels can be added together to generate a desired composite response to an incoming light signal. The SLM may contain a number of segments or sub-arrays which can be assigned to certain channels or wavelengths (or ranges of channels or wavelengths) of an incoming light signal having multiple such channels or wavelengths, and these segments can all be characterized such that appropriate patterns for each segment can be determined.

In determining patterns to be used to modulate the separate channels or wavelengths of an incoming light signal by segments of the SLM, the patterns may be distinct, aperiodic patterns, or patterns may be periodic patterns to be applied across some or all of segments (or parts of the segments). In either case, the optical response of the segments having these patterns can be tuned by turning on or off certain pixels. Predetermined or calculated sequences can be provided for the toggling of these pixels, making use of the fact that certain pixels within a segment may be known to have a larger or more coarse influence on modulated, light signals, whereas others will have a smaller or finer response on the light signals. Knowledge of the characteristics of the pixels and/or periodic pixel patterns will enable generation of segment pixel patterns without applying a "brute force" method of trying every single pattern within a segment in order to find certain optical response characteristics. In other words, it is possible to reduce the analysis for determining light patterns to a smaller subset of patterns out of all possible patterns within a segment.

BRIEF DESCRIPTION OF THE DRAWINGS

FIG. 9 is a flowchart of a method for calibrating a segment or segments of an SLM;

FIG. 10 is a flowchart of a fine-tuning method for patterns applied to an SLM;

Figure 1:
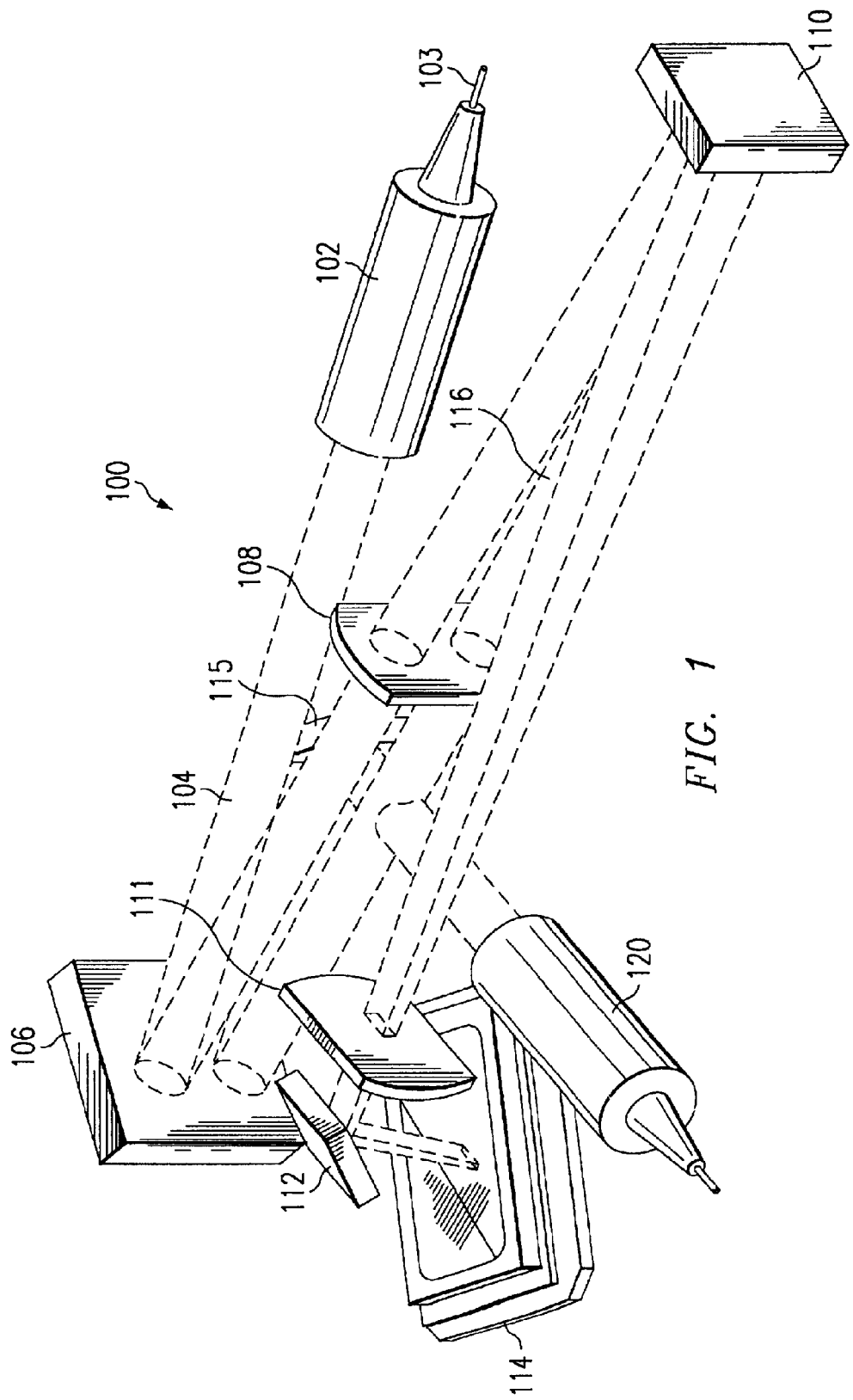
FIG. 1 is a perspective view of an optical system into which a SLM can be placed.

All of these drawings are drawings of certain embodiments. The scope of the claims is not to be limited to the specific embodiments illustrated in the drawings and described below.

DESCRIPTION OF THE EMBODIMENTS

FIG. 1 is a perspective view of the components of an optical signal processing system in which the embodiments described in this patent application can be used. Shown in FIG. 1 is an input light collimator 102, which receives an optical light signal input on optical fiber 103. From the input 102, a free-space optical signal enters the system 104. The optical signal 104 can have from 1 to N channels, each of which may be a separate wavelength "$\lambda$" ($\lambda_1, \lambda_2 \ldots \lambda_n$). Free-space optical signal 104 is directed towards a grating 106, which will spatially separate the optical channels slightly so that they will travel along slightly diverging optical paths. These diverging optical paths then pass through an imaging lens 108, which purpose is to focus the optical signals on to the DMD.

The path between the lens 108 and the DMD 114 may contain a mirror 110 for reflecting the signal back generally towards the direction from which it came. Provided next to the DMD is a correction lens 111, which can be used to adjust for situations where the grating is not at the first focal point of the imaging lens 108. In other words, the correction lens allows the path length from the grating 106 to the imaging lens 108 to be different from the focal length of the lens 108. Folding mirror 112 is provided to direct the light signals onto the DMD 114. Because of the separation of channels provided by the grating 106, each channel will fall on a slightly different portion of the DMD surface. The DMD 114 will reflect the light beam back towards the mirror 112, but the mirrors of the DMD 114 will modulate the incoming light signal such that the DMD acts as an optical signal processor. This optical signal processing could be, for example, optical attenuation, wavelength filtering, optical performance monitoring, co-channel modulation, or dispersion compensation. In systems employing multiple ports, the optical signal processor can be employed as an add/drop multiplexer. Another purpose for the optical signal processing performed by the DMD 114 could be to provide a programmable optical source, such can be formed from a wide-band optical laser whose input is filtered down to make it appear as if it were one or more sources of narrow-band light.

Still referring to FIG. 1, after reflection from the DMD surface and the mirror 112, the light signals return along a return path 116 through mirror 110 and imaging lens 108. Although this path is similar to the path for the incoming light beam 104, it is slightly spatially separated, such that when the beam strikes the grating 106 again on the return path, it is spatially offset from the position where it struck the grating 106 as the incoming path 104. The optical grating 106 thereupon re-converges the multiple channels, and directs them towards a mirror 115, which is also separated from the incoming beam 104, but is in line with the return beam 116 as shown in the FIG. 1. From the mirror 115, the reflected light beam 116 is directed towards an output of the system, which is preferably also a collimator 120.

The structure of the optical system of FIG. 1 is just an example of an optical system in which the embodiments discussed in this application can be applied. For example, in the application shown in the figure, the incoming light signal is reflected from the DMD in a manner such that the reflected light signal does not travel along the same path as the incoming light signal. In some applications, it may be desirable to direct the reflected beam back along the same path and use a circulator to separate the incoming and outgoing beam.

Figure 2:
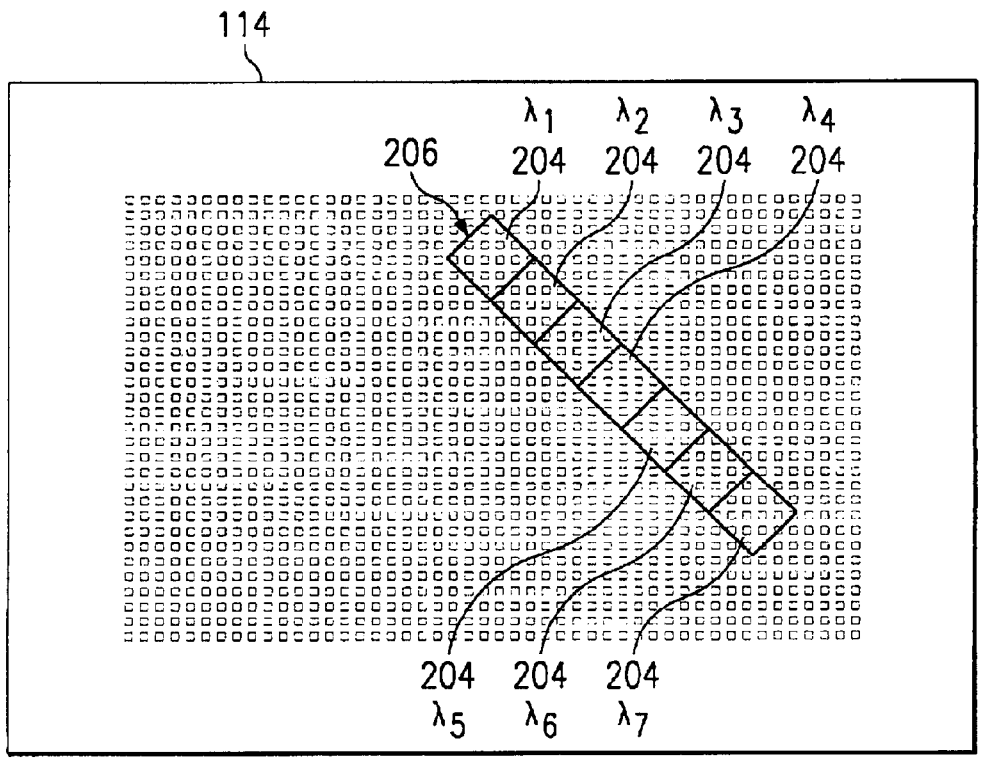
FIG. 2 is a top view of an SLM onto which several channels of an optical signal have been spread out for modulation.

FIG. 2 is a top view of the DMD 114. Shown on FIG. 2 and on the surface of the DMD 114 are a plurality of individual pixel elements 202. These individual pixel elements are, in one embodiment, individual DMD mirrors, which can be individually switched on and off by circuitry underlying the DMD pixels on a semiconductor substrate. In such an embodiment, the array may be a 768×1024 array, although many other array dimensions could be used. Besides DMD-type spatial light modulators, the principles employed here could also be applied to liquid crystal displays or other types of spatial light modulators.

Figure 2A:
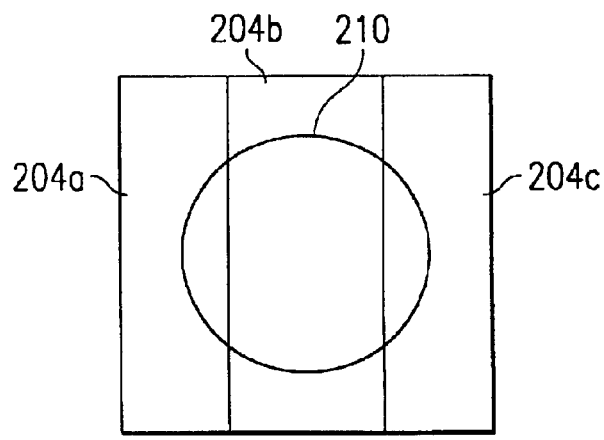
FIG. 2A is a top view of three segments of an SLM such as described in FIG. 2, but in which a channel of the optical signal is distributed across several segments.

Also shown on the surface of the DMD 114 are a number of segments or sub-arrays 204 of pixels. The segments represent divisions of the area in which the multiple channels of the incoming free-space optical signal 104 can strike the surface of the DMD 114. In this description of the embodiments, the area in which the plurality of channels of the optical signal strike the DMD will be referred to as the band 206, whereas the sub-arrays in which the channels strike are referred to as segments 204. Thus, as shown here, there would be a segment 204 devoted to receiving a first channel, $\lambda_1$, a second channel $\lambda_2$, a third channel $\lambda_3$, and so on, up until an nth channel $\lambda_n$. Within each segment 204, in general the intensity distribution will be Gaussian in shape due to the mode of the single-mode fiber. Although FIG. 2 shows each individual channel as being contained within a single band 206, and striking within a single segment 204, it is also possible to have the $1/e^2$ area, which is the area containing 91% of the power, of the incoming channel signal 210 striking over multiple segments 204a–c, as shown in FIG. 2A. This flexibility is made possible because this is an optical signal processing application, and therefore the system can be programmed to handle the division of optical wavelengths among one or multiple segments 204. For example, FIG. 2A shows an application in which the $1/e^2$ distribution of the particular wavelength channel 210 of the optical signal 104 is distributed across three segments, 204a, 204b, and 204c. Rather than distributing the channel 210 over three segments, the channel signal 210 applied onto a signal segment 204, or onto two, three, four or any other number of segments, according to the way in which the system is programmed to process the incoming optical light signals.

Once the different optical channels have been distributed across the multiple segments 204 of the band 206, signal processing is applied to operate the spatial light modulator elements controlling those different segments 204. One challenge is determining which pixels to turn on or off to achieve the signal processing results that are desired. Since a given segment 204 may have any number of pixels, and since the number of combinations of different pixels rises exponentially as the number of elements increases, a brute-force method for determining the different arrays of the pixels elements can quickly overwhelm a system for determining the patterns to be used to achieve the signal processing results. Described in this application is a system and method for more efficiently determining patterns to be applied to the pixels of the different segments 204 in order to achieve the goals for signal processing.

Figure 3A:
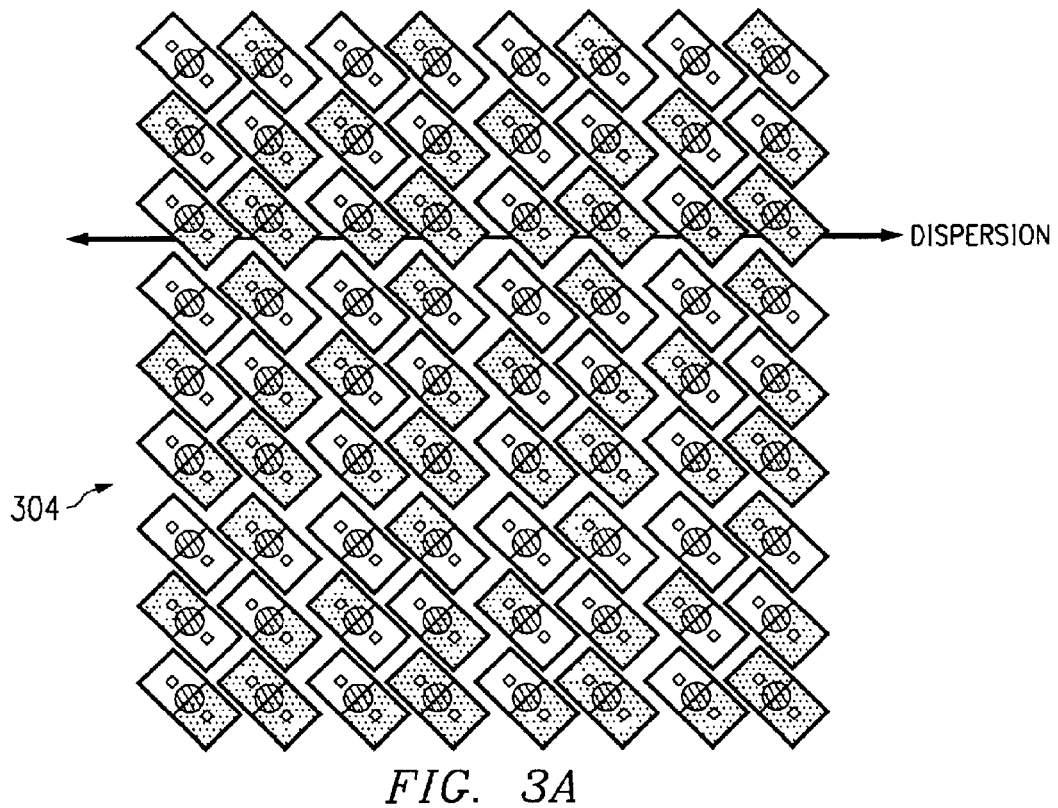
FIGS. 3A–B show a periodic pattern applied to an SLM.

FIG. 3A illustrates an embodiment in which a periodic pattern 301 is applied across the segment 304 in order to provide the desired optical signal processing. For example, a certain periodic pattern 301 can be applied across a 2×3 subset of pixel pairs or base units 302 within the segment 304, and this pattern 301 can be repeated for each 2×3 group of pixel pairs 302 across the segment 204. For example, within a 12×12 array of pixels, limiting the periodicity to 2×3 pixel-pair patterns will result in approximately 4500 unique periodic patterns needing to be generated and applied to the segment 304. Thus, rather than the $10^{43}$ of unique patterns that may be found in a complete 12×12 pattern, by using the periodicity, the number of unique patterns which must be generated is greatly reduced. The process of generating the patterns to be applied to achieve the signal processing objectives is therefore greatly simplified.

Figure 3B:
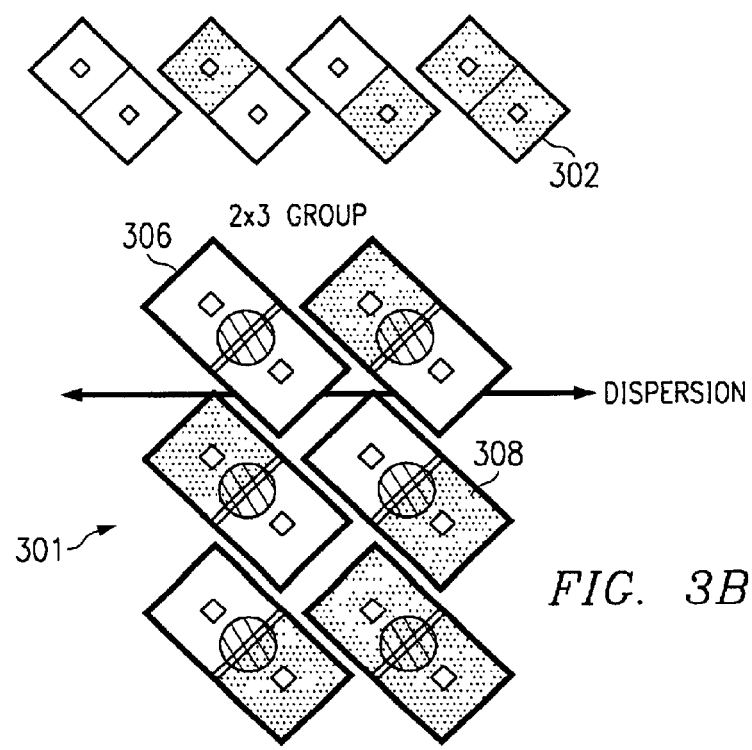

FIG. 3B shows an exemplary pattern 301 that may be applied and repeated through out the segments 304, such as to the segment 304 shown in FIG. 3A. In this example, the "on" pixels 306 are shown by the light-colored pixels, whereas the "off" pixels 308 are darkly shaded. A number of different patterns can be applied and repeated across the segments 304 in order to achieve different optical performance characteristics. These base units were chosen, in part, so that the two directions of periodicity would be orthogonal and parallel respectively to the dispersion direction across the DMD. The simplest base unit is a single pixel with an "on" and "off" state.

Within FIG. 3B there are shown six base units 302 arranged in a 2×3 grouping 304. While the base units 302 are shown having two pixels 202 each, it would also be possible to have base units of one, three, four, five, or other multiples. Any n×m set of pixels, where n and m are positive integers, can be chosen as a base unit. Further, it is possible for the group 304 to be comprised of two, three, four, five or any other number of base units 302. Again, any n×m set of base units, where n and m are positive integers, can be chosen as group or "tile." So that the optical performance is reasonably insensitive to alignment, the tile size is designed in these embodiments to be much smaller in both orthogonal directions than the spot size. As an example, the tile size may be designed to be approximately 20% or less of the spot width in the corresponding dimensions.

Figure 3C:
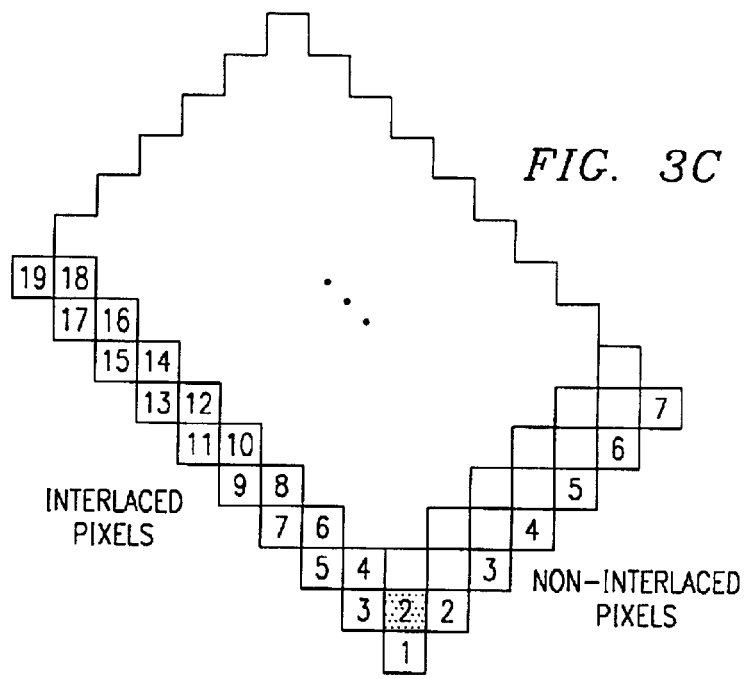
FIG. 3C and the referenced Appendix I show a pixel segment configuration and a group of non-periodic pixel patterns that can be applied to it to achieve desired optical performance characteristics.

FIG. 3C provides an example of a segment 204 in which a non-periodic set of pixel patterns is applied to modulate the incoming light signal. In this example, there are provided 7 columns and nineteen rows, and in which the rows alternate between 6 and 7 pixels each. In other words, row 1 has 7 pixels, row 2 has 6 pixels placed above and between adjacent pixels of the first row, row 3 has 7 pixels above and spaced on either side of the pixels of row 2, and so on. This arrangement of pixels for the segment 204 shown in FIG. 3C is merely exemplary. Other arrangements of pixels having different numbers of rows or different numbers of columns could be used, and is further possible to have an arrangement of pixels in which each row would have the same number of pixels. Provided in Appendix I are a set of aperiodic patterns that has been adapted to this group of pixels and which are designed to provide a range of desired optical responses. This is an example of the adaptation of pixel patterns to effect desired optical performance characteristics, and many patterns could be applied to many SLM pixel arrays or sub-arrays in accordance with the methods and systems described in this application. Further, the effects of both periodic and non-period pixel patterns can be combined in a given pixel pattern. A periodic pixel pattern can be given non-periodic variations interspersed within it to tune the optical performance characteristics. Alternatively, there can be certain areas within a pixel pattern that have periodically repeating patterns and other certain areas within a pixel pattern that have non-periodic patterns. These combination periodic/non-periodic pixel patterns can be defined as starting pixel patterns, or they can be generated as a part of the pixel pattern fine-tuning process described in this application.

Whether periodic or non-periodic pixel patterns are used within the segments 204 will depend on the performance characteristics and advantages hoped to achieve through the particular pattern selected. Non-periodic (spot-related) patterns slowly diffuse energy in to the Fraunhover envelope halo that results from the finite extent of the aperture. Periodic patterns instead make more orders available to allow energy to be diverted. If the pattern period is reasonably small compared to the size of the $1/e^2$ spot, then the approximate attenuation level becomes less sensitive to alignment. Currently, that means restricting the period to about 2 pixels in any direction. This is based on the current optical design of the beam spot area that is directed on to a given segment 204, and on current process technology. Thus, through advances in process technology and system design, it may be possible to have a periodic pattern of greater than two.

Above, the term "aperture" was used. A traditional "aperture" blocks energy equally from about the perimeter of an opening, whereas the digital aperture referred to herein, due to its digital nature, allows for the possibility of picking the points within the opening at which energy becomes blocked. In other words, in a traditional circular aperture to reduce the size of the aperture requires a gradual reduction of the opening about the entire circumference. In a digital aperture, however, such as provided by the pixels shown in FIGS. 3A, 3B, and 3C, it is possible to selectively remove individual mirrors from those that are providing the transmitted or reflected light, thereby providing greater flexibility in how the aperture is defined.

Figure 4A:
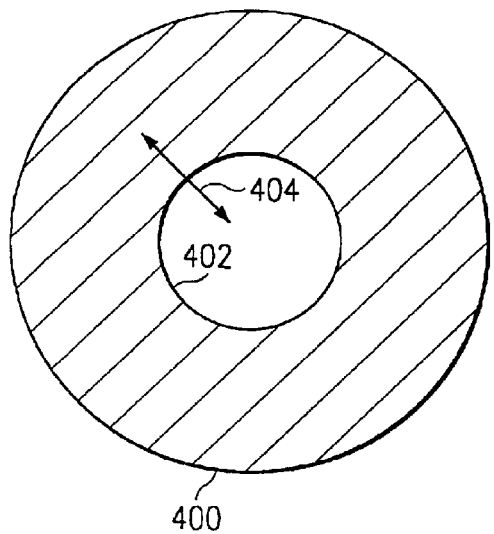
FIGS. 4A–4B are top views of a traditional aperture and a digital, pixelated aperture.
Figure 4B:
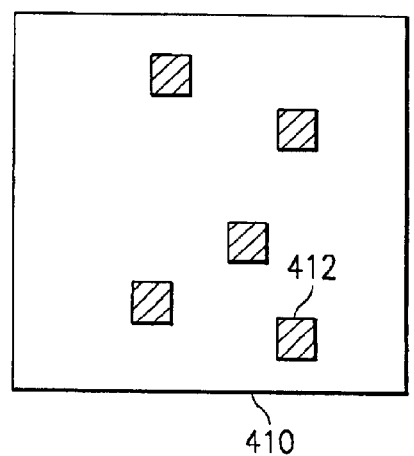

The concept of a traditional vs. a digital aperture is illustrated in FIGS. 4A–B. FIG. 4A, for example, shows a traditional aperture 400, which defines an opening 402 that can be adjusted as shown by the arrows 404. In other words, the opening 402 is set to be closer or farther from the outer circumference. In this way, the opening 402 is adjusted to allow more or less light to pass through it. Conversely in FIG. 4B, which is an array of 410 pixels, individual pixels within the array 410 can-be turned "off" selectively to reduce the amount of light being reflected from the array of 410. This turning off of the pixels at locations throughout the array allows more flexibility in how much light may pass through, thereby allowing "off" pixels 412 to be turned "off", not only for the effect on the amplitude of the reflected signal, for example, but also for the secondary effects imparted on the signal by the turning off of the particular pixel 412. Secondary effects that can be tailored by this technique include the definition of phase effects upon the composite reflected light signal.

Figure 5:
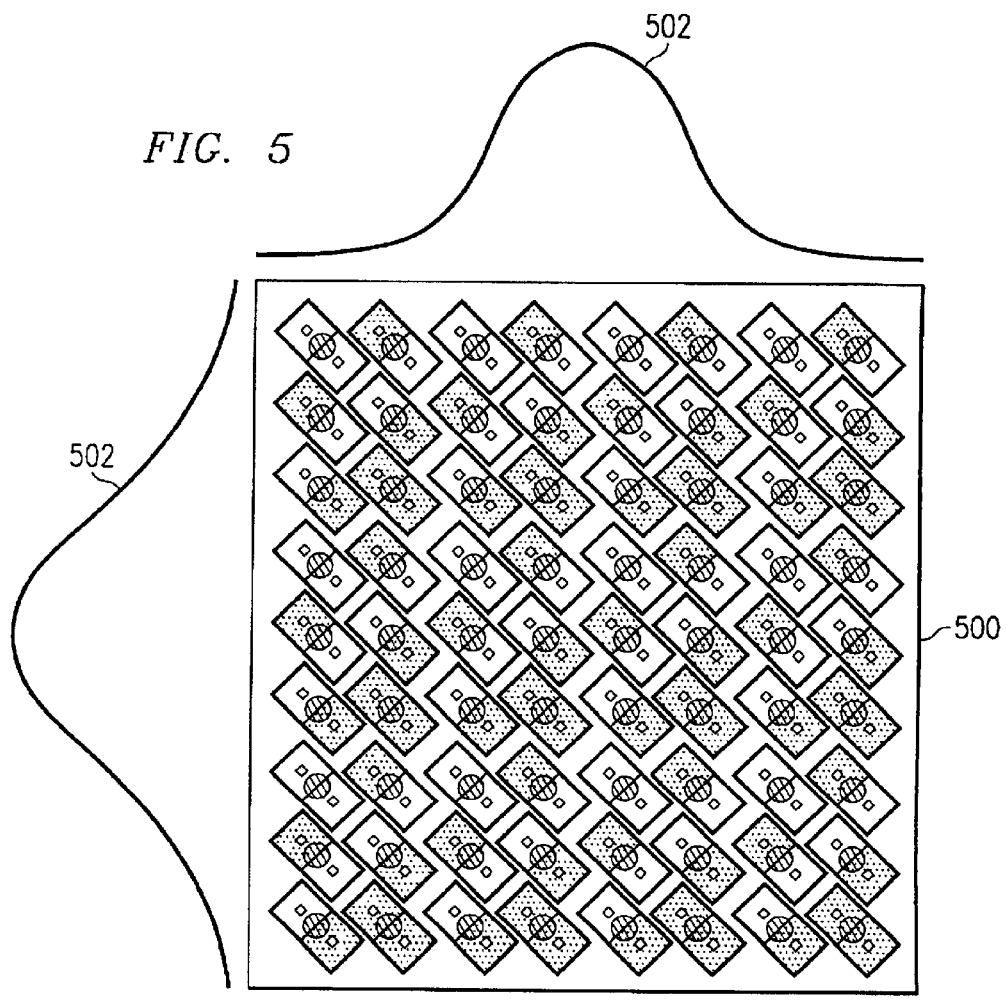
FIG. 5 is an exemplary superposition of a Gaussian spot distribution relative to a segment of pixels on an SLM.

FIG. 5 provides an array of pixels such as would be used in a segment 204, and it shows Gaussian light distributions superimposed relative to the array of pixels onto which the light is illuminated or applied. This Gaussian distribution 502 would generally be an elliptical area of light intensity, centered somewhere near the middle of the segment 204. For example, in a rectangular array of pixels comprising the segment 204, it may be advantageous to have a tighter Gaussian distribution with respect to the short side of a rectangular segment 204 than with respect to the long side of the rectangular segment 204. The $1/e^2$ dimension typically defines the Gaussian distribution, where $1/e^2$ represents the percentage of power (91%) relative to the total power of the incoming signal. The $1/e^2$ dimension is chosen typically to lie comfortably within the perimeter of the segment 204, such that excess light energy is not lost outside the boundaries of the segment 204. This arrangement also may avoid light energy spilling onto adjacent segments 204. The exact percentage of light energy contained within the perimeter of the segment is not critical. In most embodiments, however, most of the light energy of a light channel will be confined within the segment or segments assigned to it.

In the embodiment that is described above, separate λ's are designed to be confined within individual segments 204. In certain applications however, it may be desirable to process multiple λ's within a certain wavelength band. In other words, it may be advantageous to provide a certain type of processing upon a sub-band of λ's, wherein the sub-band is subset of the entire band 206 of wavelengths (λ's) being carried upon the optical signal 104.

In this application, instead of single λ's being devoted to each segment 204, as shown in FIG. 2, there could be multiple λ's beginning at the first segment 204 where $\lambda_1$ is shown, and being spaced at approximately equal intervals without regard to segment boundaries. This would allow the DMD arrays within each segment 204 to operate on multiple λ's simultaneously and to have approximately the same effect on each of them.

For periodic pixel patterns, the resolution of the pixel patterns being used in the particular segments 204 are defined such that the patterns repeat a number of times within the $1/e^2$ area of the Gaussian spot distribution. This allows the system to be less sensitive to alignment variances, because the overall size of the beam relative to any given periodic pattern is great. The Gaussian spot size might be, for example, 20 times the size of a periodic pixel pattern. A small shift in the alignment of the Gaussian spot might then only shift one period relative to the 20 periods of the pixel pattern, but the overall aperture seen by the Gaussian spot will be substantially unchanged.

Above, both periodic and non-periodic patterns can be applied as starting pixel patterns that can be used for optical signal processing. It is possible to define a number of these patterns that will achieve certain characteristics and apply these patterns according to a look-up table based on the optical characteristics that are desired and the predicted performance characteristics of a particular pattern. In order to determine the predicted performance characteristics of a particular pattern, it would be possible to measure the optical performance characteristics of those patterns.

It is also possible to characterize the pixel response of each of the pixels within the array, and to mathematically predict the optical performance of a group of pixels based on the phasor addition of the responses of the individual "on" and "off" pixels. Mathematically, the coupling of energy into a single-mode fiber can be described as the summation of phasors as follows:

$$P_r = \left| \sum_j \sum_i \left[ A_{on}(i,j) e^{j\phi_{on}(i,j)} + A_{off}(i,j) e^{j\phi_{off}(i,j)} \right] \right|^2 \quad (0.1)$$

In the above equation, the composite optical response is represented by Pr.

$A_{on}(i,j)$ represents the magnitude response for the pixel "i,j" when it is "on." I=1 to P and j=1 to Q, if there are P rows and Q columns in the array. $A_{off}(i,j)$ represents the magnitude response for the pixel "i,j" when it is "off." By the same token, $\phi_{on}(i,j)$ and $\phi_{off}(i,j)$ represent the phase responses for the respective "on" and "off" pixels.

Figure 6A:
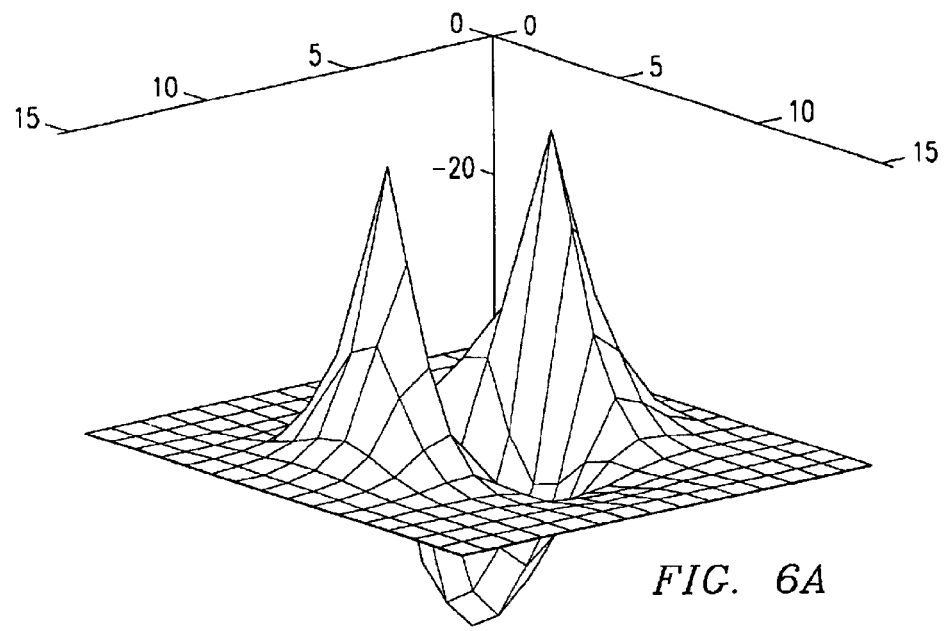
FIGS. 6A–6B are phasor model predictions for the optical response due to each "on" pixel (for 6A) and each "off" pixel (for 6B) in a segment of an SLM.
Figure 6B:
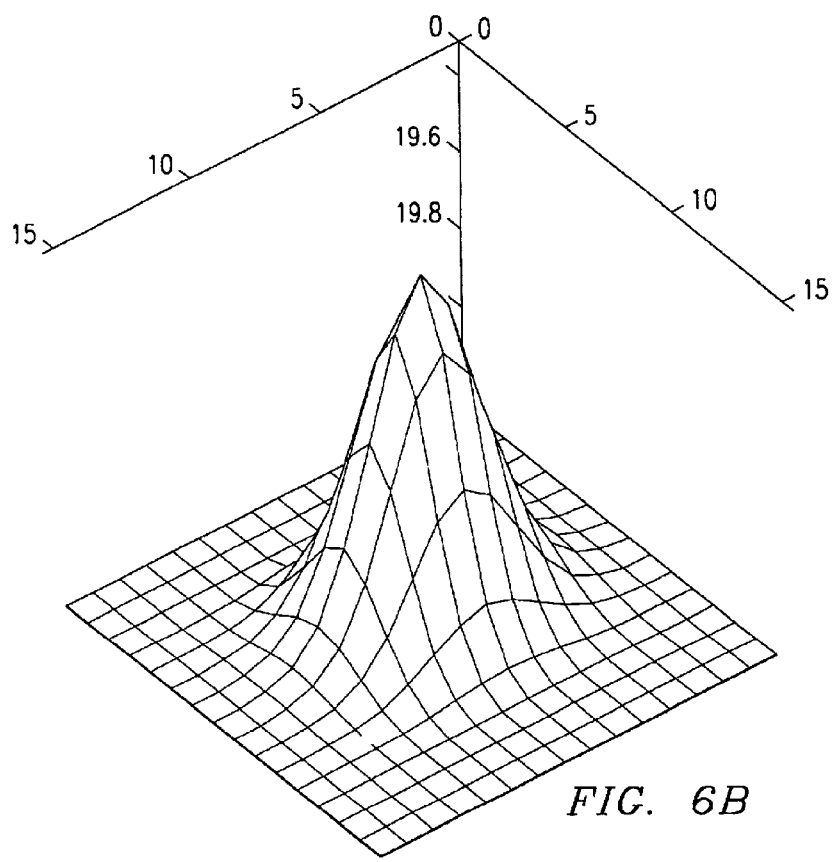

A model of the optical response characteristics of the various pixels in an array is illustrated in FIGS. 6A–6B. FIG. 6A shows the optical response of individual "on" pixels taken one at a time, mapped across the entire array of pixels within the segment 204. FIG. 6B shows the optical response of the individual "off" pixels taken one at a time. In addition to the magnitude response shown in FIG. 6A–FIG. 6B, there is also a phase effect imparted by the pixel, to the composite optical signal.

Therefore, the estimated optical performance characteristics of a group of "on" and "off" pixels are determined based on the sum of those pixels' phasor responses according to the Equation (1.1). The concept of this phasor addition is shown in FIG. 7.

Figure 7:
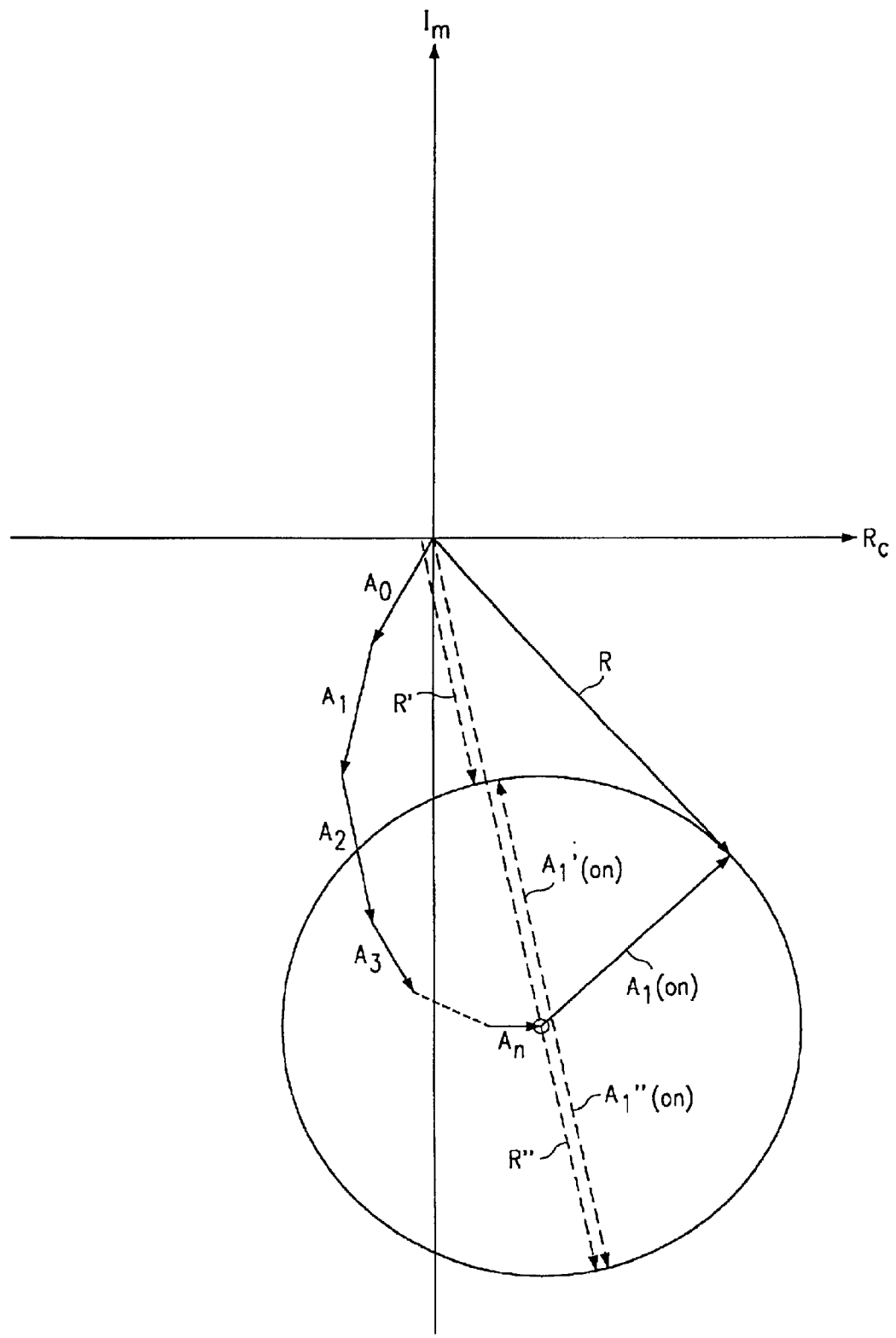
FIG. 7 is an exemplary mapping of vectors on a phasor coordinate system.

FIG. 7 is a mapping of vectors on a phasor coordinate system. A complex number is represented by x+jy, and that complex number can be represented on a coordinate system by placing the x component on the horizontal access, the Y component on the vertical access. The magnitude of the signal will be represented by the ray that passes from the origin of the coordinate system to the XY point mapped onto that coordinate system. To add components in this coordinate system, two vectors can be added by placing the beginning of one vector at the end point of another vector, as described above. The resulting vector would go from the origin of the coordinate system to the end point of the second vector.

By adding vectors in the way described above, it is illustrated in FIG. 7 that the addition of two vectors having the same magnitude can cause greatly differing results depending on the phase angle of the particular vectors. In this figure, the sum of the "off" states are shown as the phasor from the origin to the endpoint of the last phasor AN, and the phasor contribution of a single "on" state pixel is shown by the vector A1(on). The resulting vector "R," which is the arrow from the origin to the end point of the A1(on) vector, represents the total summation of "off" and "on" pixels. For a given resultant background "off" state vector, the magnitude of the result vector "R" depends on the phase and magnitude of the A1(on) vector, as shown by the circle of radius |A1(on)|. The most extreme change is the difference between the result vector drawn to the point on the circle closest to the origin of the coordinate system, to the point on the circle farthest from the origin of the coordinate system. Accordingly, to achieve the desired composition optical response, pixels for the patterns are chosen in this embodiment based both on its phase and amplitude effect. The amount of compensation achievable thus depends on the available pixel vectors. The magnitude of these pixels vectors depends on the $1/e^2$ spot size relative to the pixel size. A distribution of available pixel magnitudes can therefore be adjusted by adjusting the $1/e^2$ spot size. The phase of these pixel vectors depends on the alignment of the incoming light phase front and the state of the pixel element (on or off) in the case of a DMD. The distribution of available pixel phases can be adjusted by adjusting the incoming light phase front, or by changing the flatness or scattering properties of the SLM.

Figure 8A:
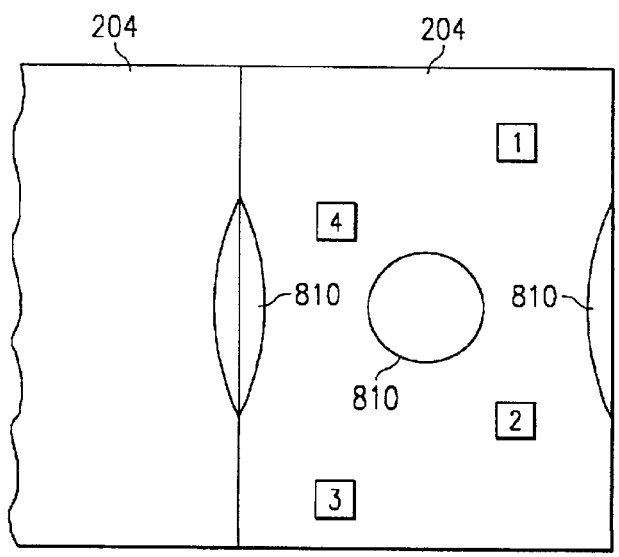
FIGS. 8A–8I are pixel sequence map schemes that can be used for the fine-tuning of optical responses of a segment of an SLM.

Not only can the definition of the phasor pixel responses be used to estimate the response of certain patterns, this predicted or estimated pixel response characteristic can be used to fine-tune the response of the optical signal processor relative to the response that was originally provided by the original patterns. The pixel sequence map of FIG. 8A shows how this can be done within the segment 204 having multiple pixels 202. Within the segment 204, there may be provided groups of pixels that are within in priority class 810. These represent pixels, which may be deemed to be important enough, for proper reflection of the optical signal or to avoid cross reflection from the signals of adjacent segment, such that the pixels are not used for modulation of the incoming optical. These priority class 810 pixels would not be modulated during normal or usual operation, and would thus remain in their original "on" state. Within the pixel segment 204, there can be established a priority of pixels to be toggled based on the expected influence of those particular pixels. In other words, the coarser adjustments may be made first by using pixels with a larger magnitude effect on the modulation of incoming light signal, and by then proceeding to pixels having lesser effects. As mentioned, in order to determine the optical response of the given system, it must be kept in mind that each pixel will have both a phase and magnitude response on the overall response of the segment 204.

Figures 8B, 8C, 12:
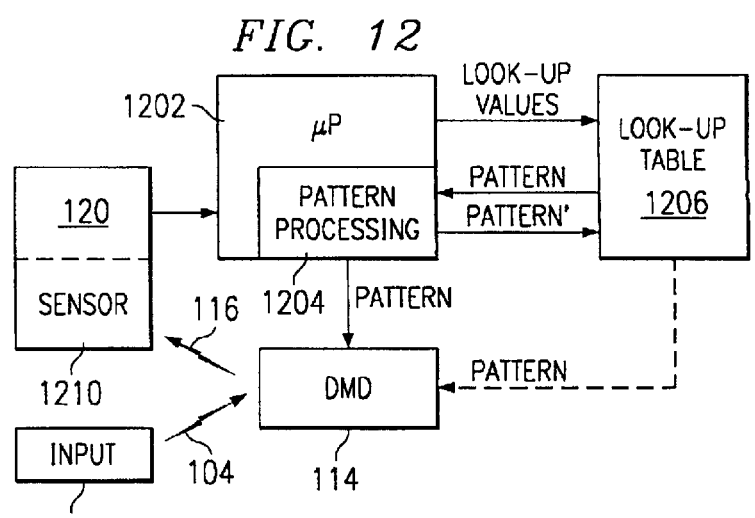
FIG. 12 is a block diagram of a system for carrying out the methods for generating optical patterns.

As an example for the implementation of priority, the highest priority pixel for modulation might be as shown in the figure. This would be the first pixel to toggle to affect the optical performance characteristics of the spatial light modulator. The pixel labeled "2" would be the next in priority. The pixel labeled "3" would be next after that, and so on. FIGS. 8B–8I show ways in which the priority can be assigned. For example, FIG. 8B illustrates a "spiral" pixel assignment priority, wherein the starting pixels are at the outer corners and the assignments generally move to the center of the pattern as the process moves on. The specific ordering of pixels shown in FIG. 8B is an example of one "spiral" approach, but other orderings could be used to effect a generally spiral-shaped assignment priority. FIG. 8C illustrates the spiral approach more simply in a one-pixel wide segment.

Figure 8D:
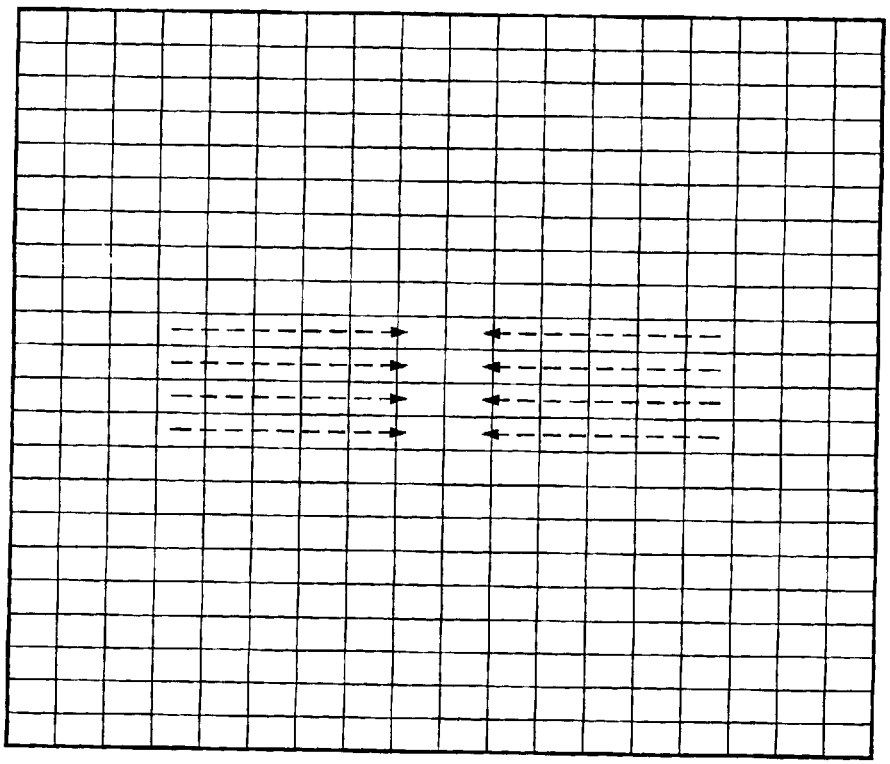
Figure 8E:
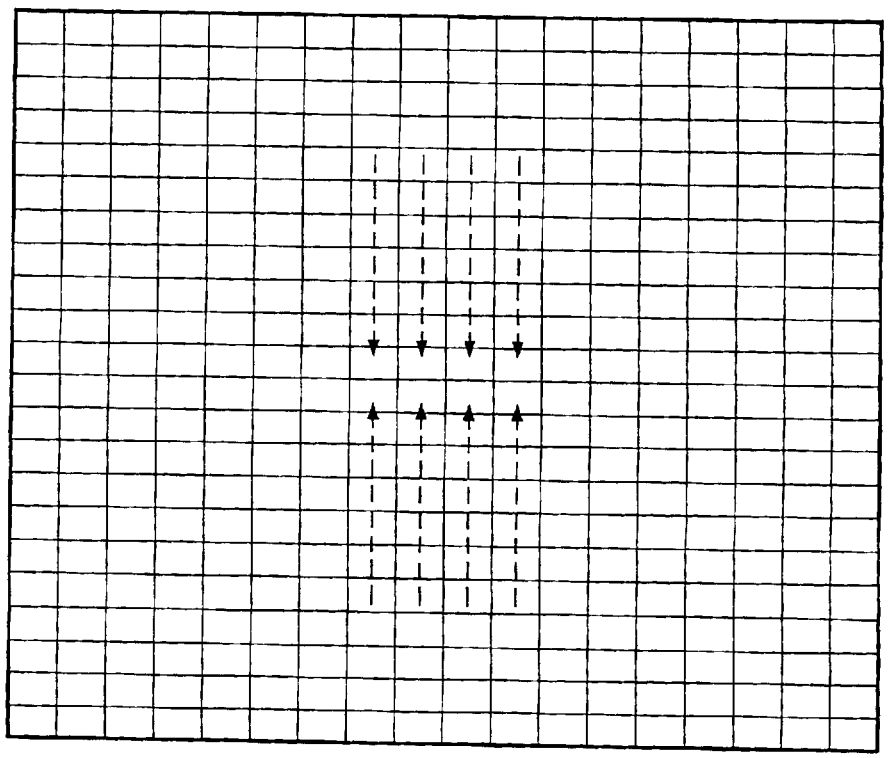
Figure 8F:
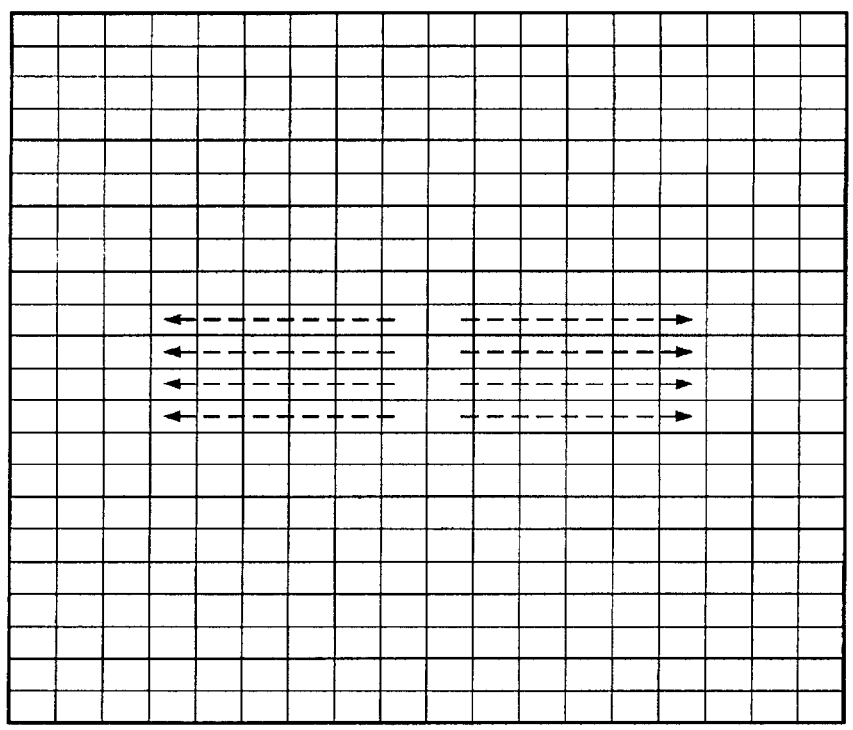
Figure 8G:
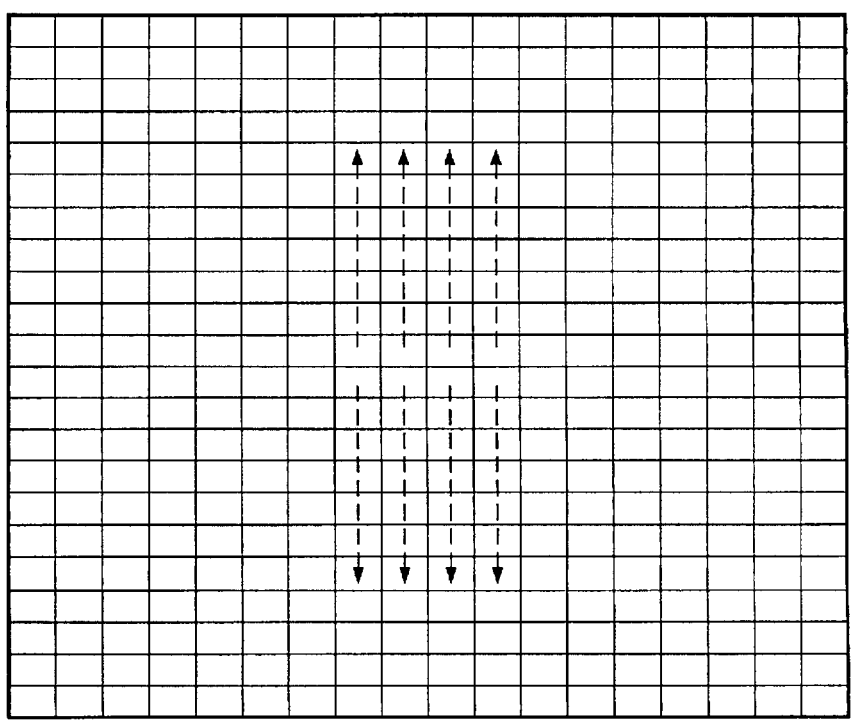
Figure 8H:
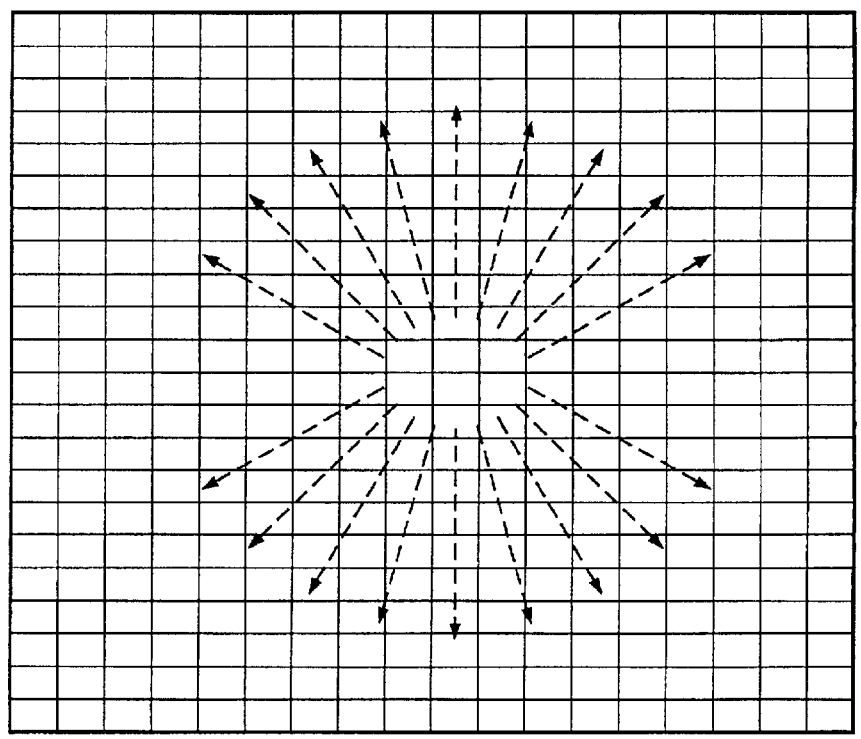

FIGS. 8D–8E more generally show an "outside-in" approach of pixel assignment sequencing. This shows that the pixel assignment process can generally proceed inward from the outside in any dimension within the segment. FIGS. 8F–8G shows that an "inside-out" approach can also be used, whereby the pixel assignment sequence generally moves from the center of the segment toward the outside perimeter. FIG. 8H shows a specific variation of the inside-out approach, wherein the pixel assignment sequence proceeds from the center to the outside in radial spokes from a center point. Inversely, a spoke-oriented outside-in approach could also be employed.

Figure 8I:
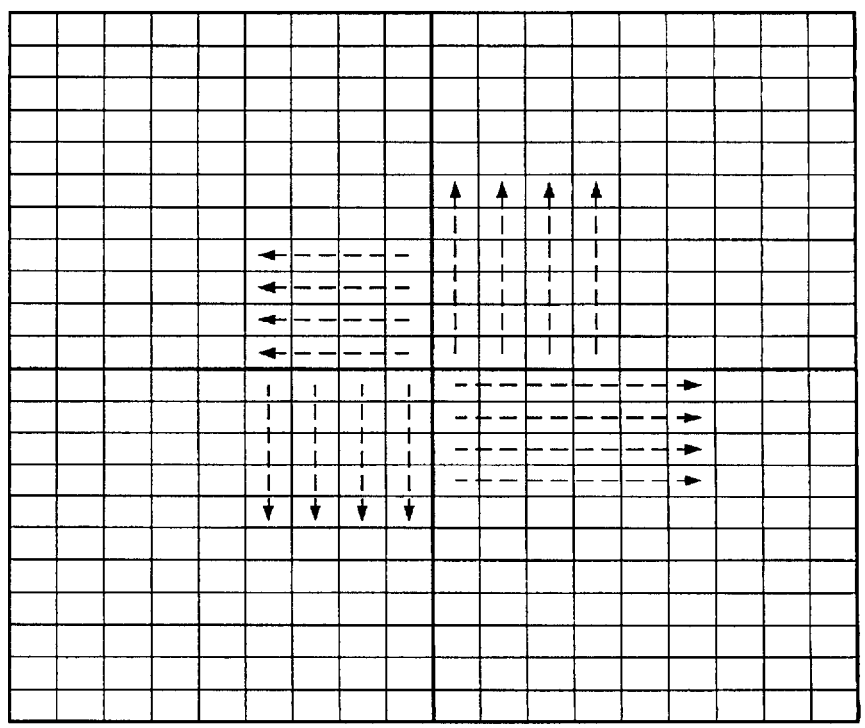

FIG. 8I shows a quadrant symmetry approach, in which for each move in one quadrant, a symmetric move is made in one (or three) other quadrants. Thus, for example, if a move is made in the lower right quadrant, a symmetrical move is made in the upper left quadrant (or, if relying on four-quadrant symmetry, in all three other quadrants). Other variations on this approach would be to divide the segment into other than quadrants, and maintain the symmetry within the other divisions. For example, the segment can be divided into halves, with symmetrical moves in both halves. This "quadrant" approach results in reduced computation, because if it is assumed that symmetrically placed pixels in all four quadrants have similar effect on the incoming light signal, then the effect can be multiplied by four, and the possible pixel patterns that have to be tested are reduced to one-fourth. This principle could also be applied in the fine-tuning algorithms described below with respect to FIG. 10, wherein the effect of toggling a single pixel could potentially be multiplied by two, three, or four, to approach the target optical performance with fewer computations. Thus, if the computation determines that the toggling of two pixels in the tested position most closely meets the target response, then that result could be used and two of the four symmetrical pixels could be used. Many variations on this approach are possible.

Although the pixel sequence mapping schemes are described above with respect to sequences for the adjustment of individual pixels within segments, the pixel sequence maps could also sequence groups of pixels, whereby multiple pixels can be turned on or off in groups. These pixels could be neighbors to each other, such as all within a block of four adjoining pixels, or they could be symmetrically located to each other, such as symmetrical in two halves or four quarters of a segment. The pixel-mapping scheme described in this application accordingly encompasses these schemes and other consistent pixel mapping approaches.

FIG. 9 shows a high-level algorithm flow for the tuning of an optical signal processor as generally described above. Beginning at block 902, the particular segment 204 being employed to process a particular optical channel having a particular wavelength, $\lambda$, may be initialized and/or calibrated. In order to calibrate the particular segment 204, it first must be determined where the particular Gaussian spot distribution for the channel/wavelength of interest is located within the DMD array. The group of pixels that will form the segment 204 is defined in the software to encompass the Gaussian spot distribution, such that most of the $1/e^2$ energy is defined to be well contained within the segment 204. At this time, the individual pixel estimations are made for the individual responses of each of the pixels within the segment 204 based on the known-at-this-time Gaussian spot distribution.

It may be possible to avoid the actual characterization of individual pixel responses by the measurement of the optical response of those signals if the optical response characteristics of groups of pixels is predictable from time-to-time, i.e., if the optical system is well-behaved relative to models which have already been developed for the character of that optical system. In such embodiments, the optical response of varying optical patterns can be mathematically estimated rather than measured. It is also possible, however, to individually measure the response of each pixel once the Gaussian spot distribution has been defined within a given segment 204.

Still within block 902, a set of periodic patterns are generated or recalled (see FIG. 2 and accompanying text). As with the estimates of phase and amplitude associated with each pixel in a well-behaved system, it may be possible to have a set of periodic patterns that provide predictable responses to the optical signal in a well-behaved system. Alternatively, it may be desirable in a given system to characterize each pattern to determine whether the pattern corresponds with expected optical response characteristics once the patterns are trusted or understood to accurately reflect the optical response characteristic that is desired, this set of patterns can be stored in a look-up table for future reference during the operation of the device.

As an alternative to having patterns defined for the entire segment 204, it is also possible to have a set of periodic patterns that will be repeated across the segment 204 of pixels. Once the set of patterns to be used, whether defined as an entire non-periodic array pixels or of a repeating set of pixels, the process can proceed to the next step.

At block 904, certain optical performance instructions are provided to the optical signal processor such that the optical signal processor can achieve the desired optical performance characteristic. The instructions are represented by the input from the block 906 to the processing block 904. At block 908, the patterns to be applied through the optical signal processor are adjusted to achieve the optical performance characteristics desired. After this first step of synthesis, it is first necessary to send the particular pattern in memory to the DMD mirror display at block 910. At this time, it is possible to illuminate the segment 204 with the optical light of the channel/wavelength of interest and measure the actual optical performance, and to determine, according to decision block 912, whether the optical patterns applied to the DMD have achieved the desired optical performance characteristics. For example, in a system where it is desired to provide a certain level of attenuation of the optical channel, the actual attenuation of that channel may be measured for the pattern that has been applied. Based on the stored values of individual pixel responses, individual pixels may be turned "on" and "off" within the pixel display according to the pixel sequence map such as defined in FIG. 8, or according to another set of priorities. This process can iteratively continue until the desired optical performance is reached, or in this embodiment until the desired optical attenuation is achieved.

If the optical performance characteristics have been achieved, the program flow can end or can proceed to the next channel (block 914) and repeat. But, if the desired optical performance characteristics have not been achieved, the program flow returns accordingly to decision block 912 to block 908 via loop 913 to again find new pixels to more finely tune the optical performance of the system.

FIG. 10 is a flowchart exemplifying in greater detail a process for the synthesis of the patterns for achieving desired optical performance levels.

Beginning at block 1002, is the summation of all i=1 to N off-state phasors, plus the present state map multiplied by the delta phasor for each "on" pixel (in this approach, a delta phasor contribution is added for each "on" pixel). The "i" represents individual mirrors, from 1 to N, where "N" is the total number of pixels. P(i) is a current pattern array where there is one element for every mirror and each element takes on the value of either "0" or "1" depending on whether that mirror is off or on. The off-state phasor (i) is the background noise when the "i"th pixel is turned off. Decision block 1004 branches program operation in the direction of decreasing attenuation, which means turning pixels on, or increasing attenuation, which turns pixels off.

Still referring to FIG. 10, from decision block 1004, for decreasing attenuation, a processing group 1005 is executed for a variable k=1 to N', where N' is the total number of pixels that are available to be modulated in accordance with the pixel sequence map/table such as described in connection with FIG. 8. N' is a number which is less than or equal to N, where N is the total number of pixels 202 within a segment 204. Specifically, N' would be equal to N less the number of pixels in the priority class 810. A function, S(k) describes a pixel sequence map, which may be defined as described with respect to FIGS. 8A–8I, and maps a sequence number to a pixel number within a segment array. For example, if the 12$^{th}$ pixel defined in the pixel array is defined according to the sequence map as the first pixel to be considered, S(12) will return the value "1." Thus, the sequence map defines the order in which pixels should be considered when processing a segment, where "processing" is the act of turning pixels on or off.

At block 1008, k is mapped to the corresponding location within the segment to see whether the corresponding pixel is "off," because, assuming that turning "on" pixels decreases attenuation, the goal of decreasing attenuation is accomplished only by turning "on" those "off" pixels according to the sequence map. The test is described at block 1008 is whether P(S(k)) is "0" or "off." As shown at decision block 1008, if the pixel is already "on," the process returns to block 1006, at which time the next pixel identified by the sequence map function S(k) can be tested.

At block 1010, the process simulates the effect of turning the S(k) pixel "on." At block 1010, then, the current estimated optical performance characteristic X is estimated by adding to it the delta phasor contributed by the S(k) pixel and squaring the sum. In this example, the optical signal power or attenuation is being estimated. The squaring in this example is made for the purposes of this power or attenuation estimate, but other calculations may be used for other types of optical performance estimations. The new value is shown in block 1010 as X'. At block 1012, X' is compared to a target optical performance value to see whether or not it exceeds the target optical performance, which in this example, assuming that each time a pixel is turned on the attenuation is decreased, means that the X' value is closer to the target than X was.

If the X' value is less than or equal to the target, then the process continues at block 1014. At block 1014, pixel S(k) of the array, i.e., P(S(k)) is designated to be "on," thereby adjusting the optical pattern applied to the segment 204. But if the target was exceeded according to the decision block 1014, then the S(k) pixel is left unchanged (i.e., "0" in this branch) and execution returns to block 1006, where k is incremented, and the next pixel (S(k)) in the array is tested.

For the other branch, of increasing attenuation, the same general algorithm described above is used for an increasing attenuation processing block 1019, in which "on" pixels are turned "off." First, at block 1022, the S(k) pixel is tested to see if it is "on." If the pixel is "on," the consideration of the pixel continues at block 1024 and so on, but if the pixel is already "off," there can be no increasing of attenuation in this exemplary embodiment where "on" pixels are assumed to add power to the output, and the process accordingly returns to block 1020 where k can be incremented.

If the S(k) pixel is "on," however, it is tested at block 1024 to see the contribution that would be made by turning the pixel off. This test yields X', which is the predicted performance characteristic achieved by turning that pixel off. At block 1026, X' is tested against the target, and if it is less than the target, the process returns back to block 1020. But if X' is greater than or equal to the target, then the turning off of the test pixel had the desired result and that S(k) pixel is turned off at block 1028. At block 1029, the performance characteristic X is replaced by the X value, and the process continues at block 1020. This process essentially adjusts the performance characteristic of a given group of pixels in a non-periodic fashion according to the priorities exemplified in the sequence maps of FIGS. 8A–I.

The above method describes a procedure for tuning based on estimated or actual optical performance (from measurement of the optical response when the segment 204 is illuminated by the light signal) based on the toggling of individual pixels. In the exemplary method above, it is assumed that each "on" pixel adds power or decreases attenuation to the overall optical response. In other embodiments, however, it is possible that certain pixels within certain patterns can have the inverse effect, in which turning a pixel "on" can actually increase attenuation by interference effects, and vice versa for "off" pixels. It is anticipated that for these alternative embodiments that the process can be modified to account for this "inverse" effect. For example, rather than approaching the target optical performance in a continual level—all from a single side of the target (e.g., for an attenuation embodiment, either approaching the target attenuation either always remaining above the target in an increasing attenuation situation or always remaining below the target in a decreasing attenuation situation), the methods described herein could be adapted to test in each instance whether toggling the pixel under consideration makes the estimated or actual optical response closer to the target.

Figure 11:
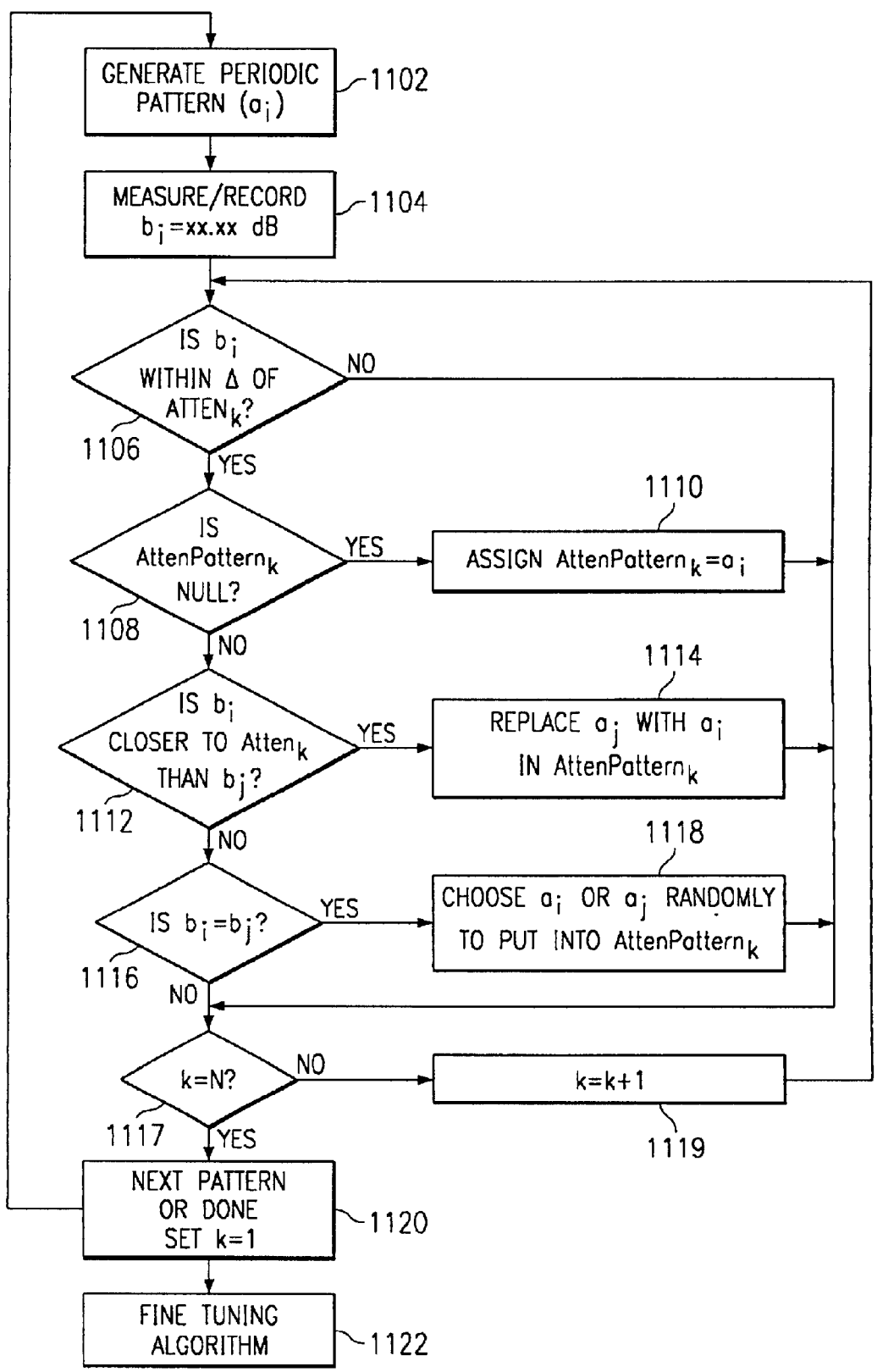
FIG. 11 is a flowchart of a method by which patterns can be initially generated and associated with certain desired optical response characteristics.

Much of the above discussion relates to adjusting or tuning the optical performance of an SLM based on patterns and the tuning of patterns to achieve certain optical performance characteristics. FIG. 11 is a flowchart of a process by which the original patterns to be applied can be initially established or calibrated for a segment 204 or sub-array of pixels within an SLM. In the approach shown here, a periodic pattern such as the one shown in FIG. 3B is developed and repeated across the segment or portions of the segment.

In the method of FIG. 11, a loop is established whereby a number of periodic patterns are developed to achieve desired optical performance characteristics. From a definitional standpoint, each starting periodic pattern may be thought of as "$a_i$", and there may be from i=1 to N of these patterns. The measured optical performance characteristics for the corresponding patterns may be referred to as "$b_i$". Thus, for example, if the optical performance characteristic of interest is attenuation, $b_i$ would be the optical attenuation associated with the pattern, $a_i$. There may be a number of desired optical performance characteristics, which may be referenced as a look-up vector of such values of M values, where the individual targets $Atten_k$ are stored in an array having M storage locations, indexed from 1 to M.

At block 1102 of FIG. 11, a starting pattern, $a_i$, is applied to the segment 204 of interest in the SLM. At block 1104, the optical performance characteristic, $b_i$, associated with the pattern, $a_i$, is measured. At decision block 11106, $b_i$ is compared to the target optical performance ("$Atten_k$") for each k value, where k is the index for the target optical performance, and where there may be from 1 to M of such target performance levels. If the measured performance is within a maximum desired deviation ("$\Delta$") from the target performance, $Atten_k$, for one or more k values, then $a_i$ can generally be assigned in the system as the pattern to be associated with the target performance, $Atten_k$. Having found sufficiently close matches for some or all of the $Atten_k$ values, the process for finding a potential match for a given $Atten_k$ could end at this point. Alternatively, a new pattern can be sought that still more closely approximates the target performance. The pattern which is intermediately stored or finally stored to achieve the target performance is described herein as "AttenPattern," and there would be k=1 to M of these patterns, corresponding to the 1-to-M target performance levels.

Assuming that the first time through the process of FIG. 11, that the initial pattern, $AttenPattern_k$ is a "null" pattern, which is a default value—typically a value that would be invalid as an actual pattern. At block 1108, the process tests to see whether such a null pattern is presently stored in the $AttenPattern_k$. In the event that AttenPattern has the "null" value stored in it, then the "null" value for $AttenPattern_k$ is replaced at block 1110 with the present $a_i$ pattern. At block 1112, the $b_i$ performance relative to the target $Atten_k$ is compared to a prior value, represented by "$b_j$". If $b_i$ is closer to $Atten_k$ than $b_j$, then at block 1114, $a_j$, which had been stored in $AttenPattern_k$ as the pattern to achieve this $Atten_k$ performance, is replaced in $AttenPattern_k$ with $a_i$, thereby adjusting the optical pattern associated with the $Atten_k$ performance level. If, on the other hand, $b_i$ is determined to be approximately equal to $b_j$ according to the test at block 1116, then at block 1118, either $a_i$ or $a_j$ may be stored in $AttenPattern_k$.

At block 1120, after the $a_i$ pattern has been assigned, if possible, to a performance level and a corresponding location within the $AttenPattern_k$ array, the process for the next periodic pattern continues at block 1102. The overall loop continues, proceeding from block 1102 through to 1120 through applicable intermediate steps, until all "i" values of $a_i$ have been satisfied.

At the end of the process, AttenPattern will be a lookup vector of patterns to achieve Atten. In other words, $AttenPattern_k$ will contain a pattern $a_i$ that produces $Atten_k$ within a specified measure or "$\Delta$," although as described below, not all $AttenPattern_k$'s will necessarily have assigned patterns. Also shown is a "fine tuning" block 1122, which can be used to adjust the optical patterns to approximate more closely the target optical performance values. Processes for "fine tuning" can be followed here in accordance with some of the techniques that have been previously described in this application, such as the one described in connection with FIG. 10. For example, if, having followed the above process, some values of $AttenPattern_k$ are still null, another algorithm can be used, for example, starting with a pattern $a_m$ that yields a performance characteristic $b_m$ is closest to the target optical performance $Atten_k$ for the still null $AttenPattern_k$ array location. For example, from the starting value for these null $AttenPattern_k$ locations, previously described fine tuning algorithms can be used to adjust the patterns applied to achieve the desired optical performance characteristics.

FIG. 12 is a block diagram of a system to carry out the methods of generating patterns for a spatial light modulator described in this application. The system includes a DMD 114 that operates under control of a microprocessor 1202. Microprocessor is used here as a general term describing control circuitry, and it encompasses digital signal processors and peripheral circuitry that may be interposed between an actual microprocessor and the DMD 114. The microprocessor 1202 is in electrical communication with a memory 1206, which may more specifically be a look-up table 1206. The microprocessor can retrieve pixel patterns by sending a look-up value to the table or by generating an actual address for a particular memory location representing an address in a look-up table. Within the microprocessor 1202 is included a pattern processing block 1204, which can adapt particular patterns either to be applied to the DMD 114, or to be stored back into the look-up table, depending on whether the optical performance of the DMD is being tuned or the patterns in the look-up table 1206 are being refined or generated. As indicated by the dashed line between the look-up up table 1206 and the DMD 114, it is also possible to bypass the microprocessor 1206 in providing patterns to the DMD.

The microprocessor 1202 is operable to generate and apply a pixel pattern to the spatial light modulator 114. If an optical signal 104 is then applied to the SLM 114, a sensor 1210 can be provided at the output 120 of the system or elsewhere, to measure actual performance of the SLM 114 having the pixel pattern applied to it. The microprocessor receives an signal from the sensor 1210, indicating the performance of the SLM 114, and accordingly can adjust the pattern being applied to the SLM 114 to more closely achieve a target optical response value. The microprocessor 1202 can also store an updated pattern in the look-up table 1206 so that the updated pattern can more closely match the target optical performance.

A few preferred embodiments have been described in detail hereinabove. It is to be understood that the scope of the invention also comprehends embodiments different from those described, yet within the scope of the claims. Words of inclusion are to be interpreted as nonexhaustive in considering the scope of the invention. While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

Appendix I

0.0 dB attenuation
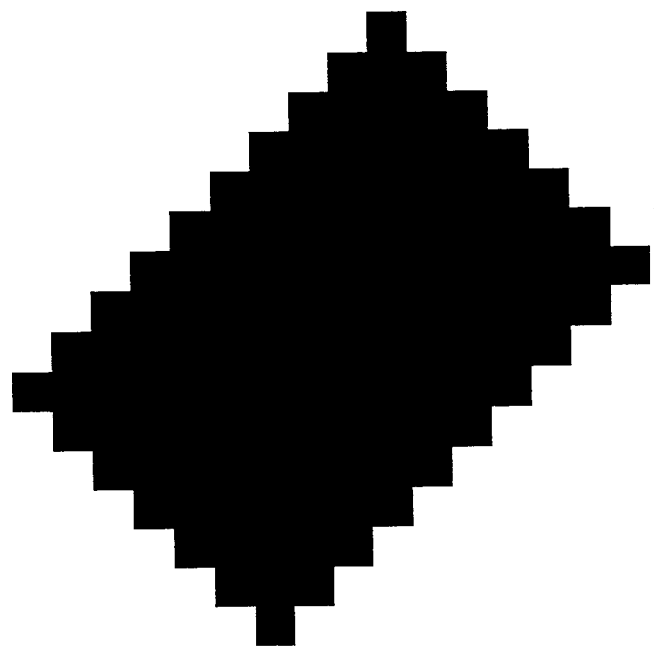

0.2 dB attenuation
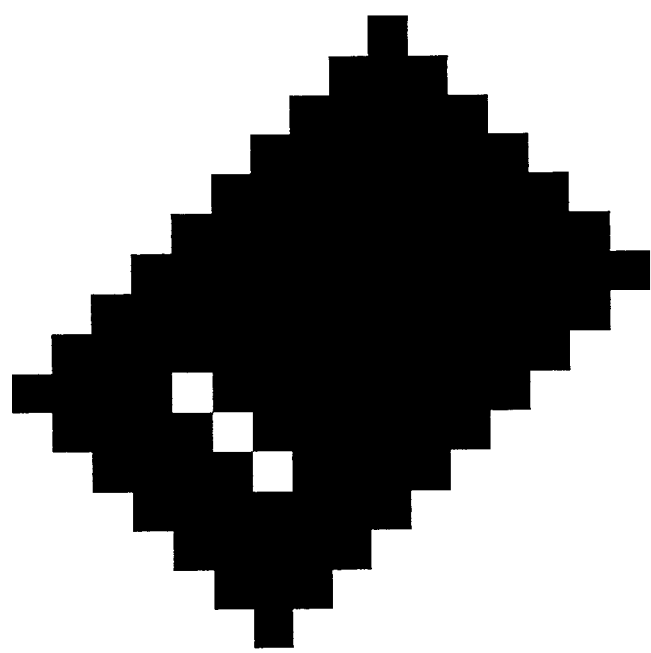

0.4 dB attenuation
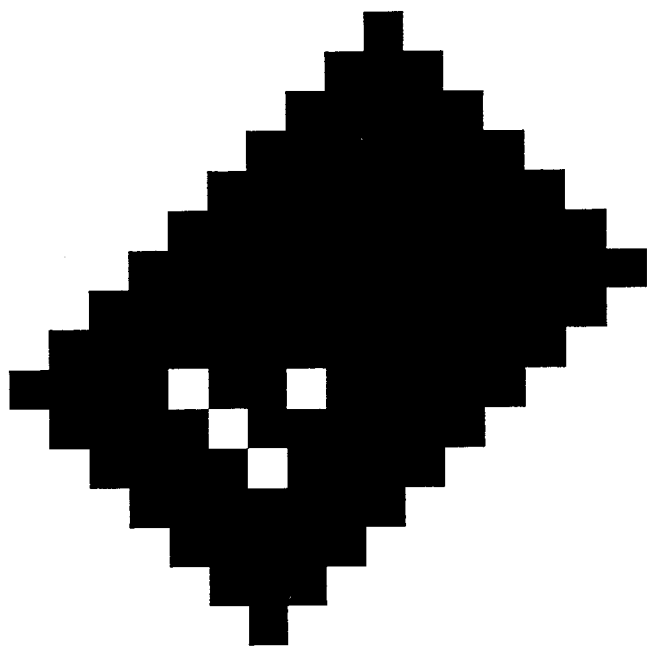

0.6 dB attenuation
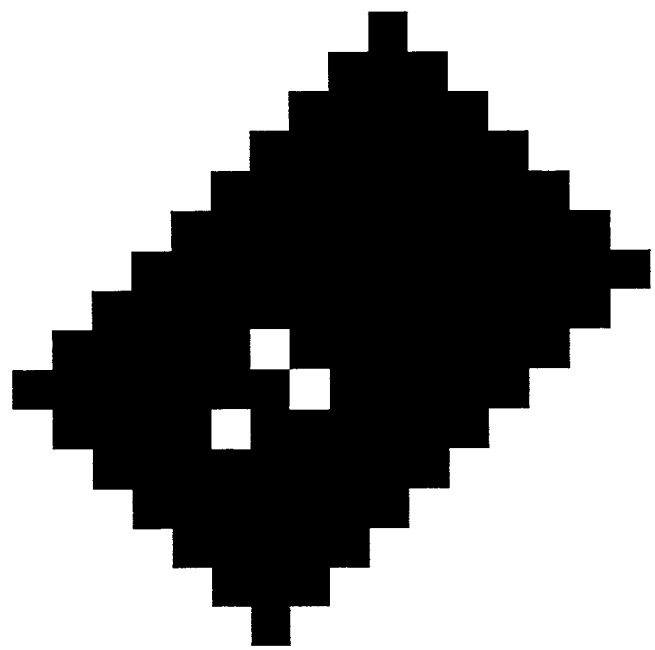

0.8 dB attenuation
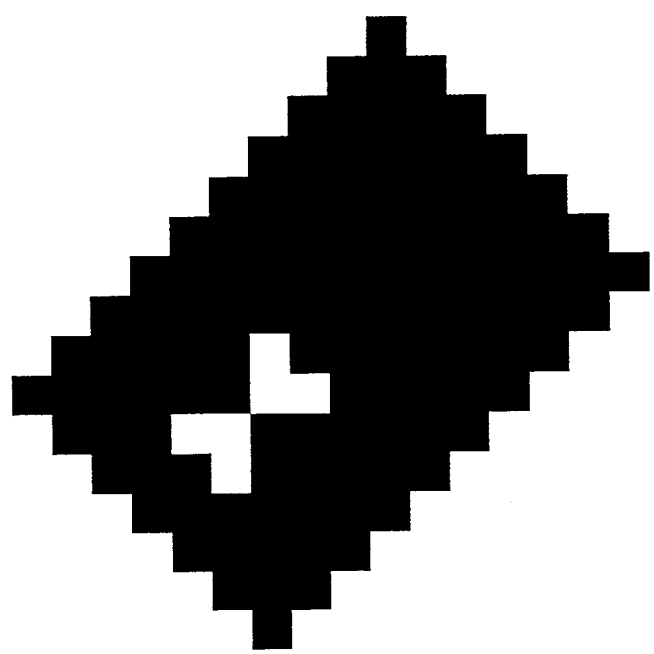

1.0 dB attenuation
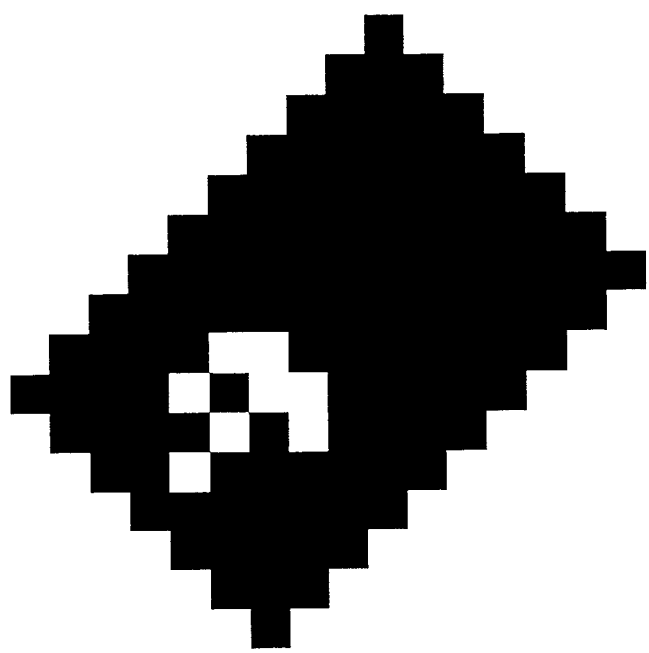

1.2 dB attenuation
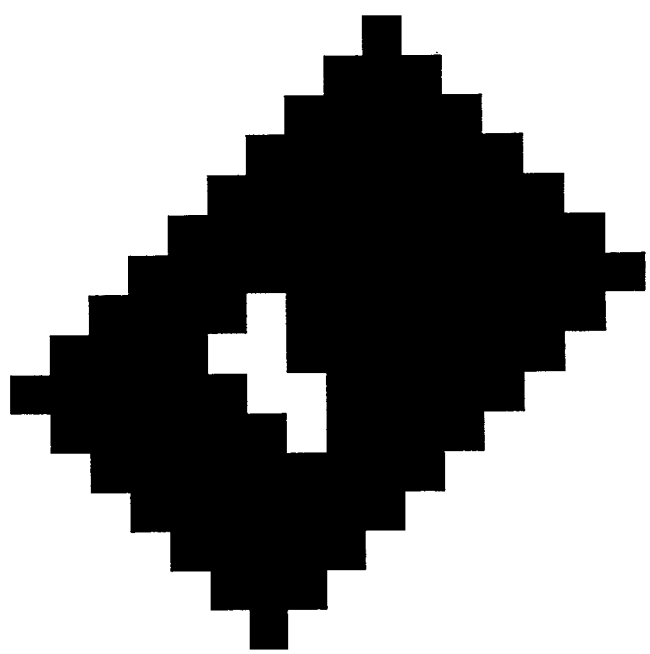

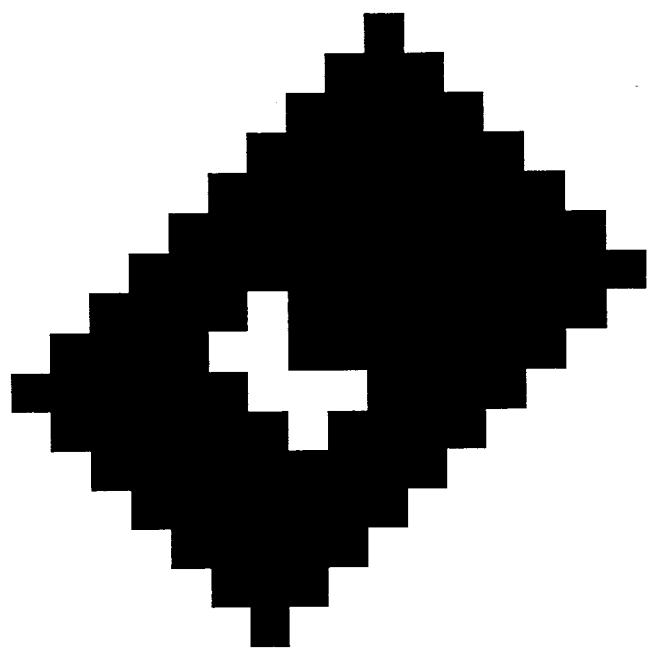
1.4 dB attenuation 1.6 dB attenuation
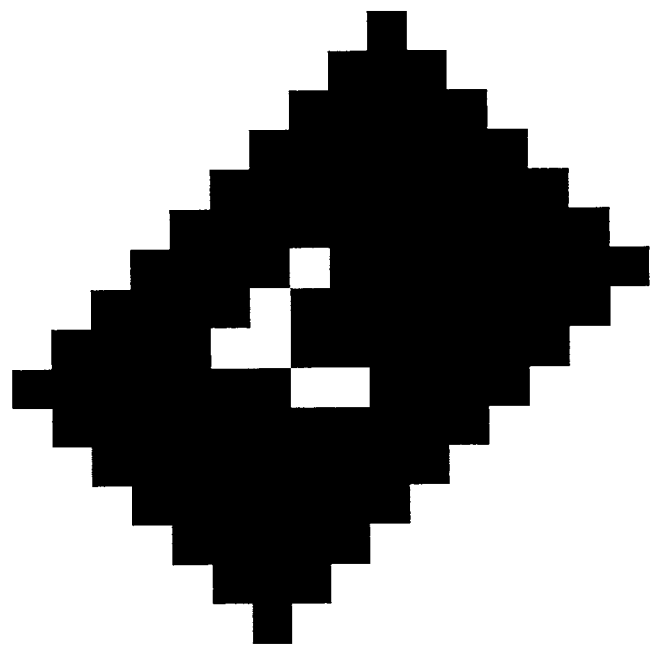

1.8 dB attenuation
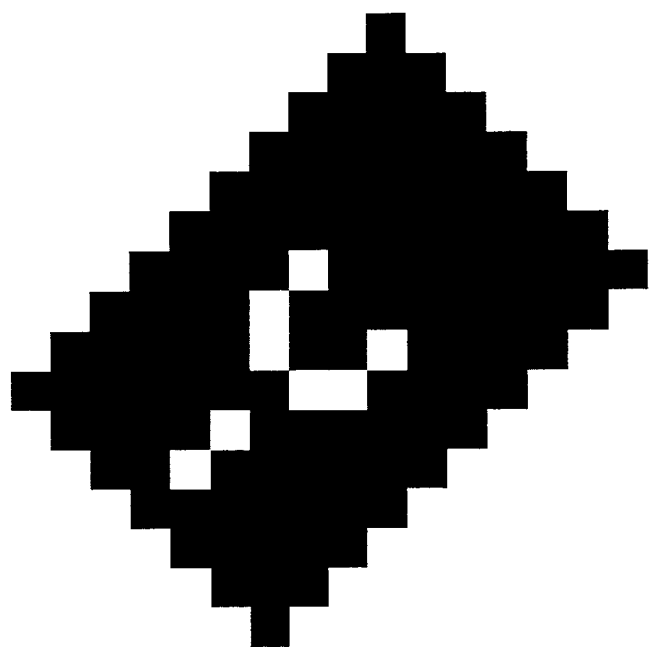

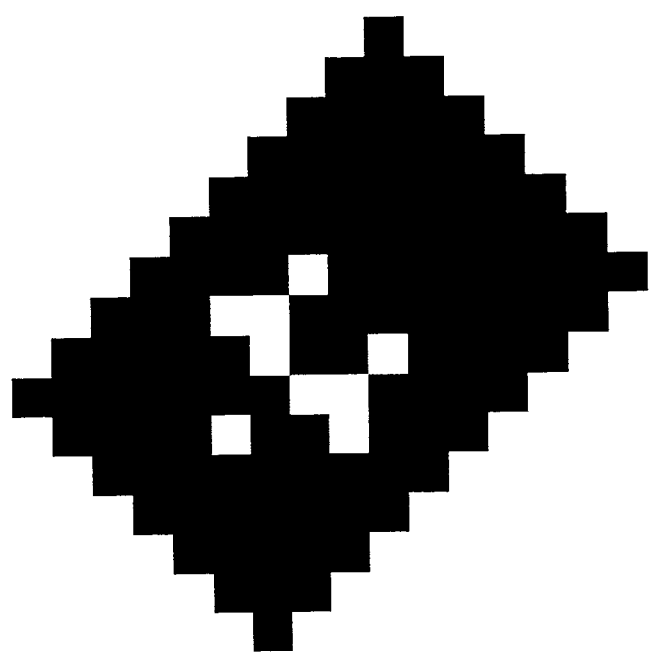
2.0 dB attenuation 2.2 dB attenuation
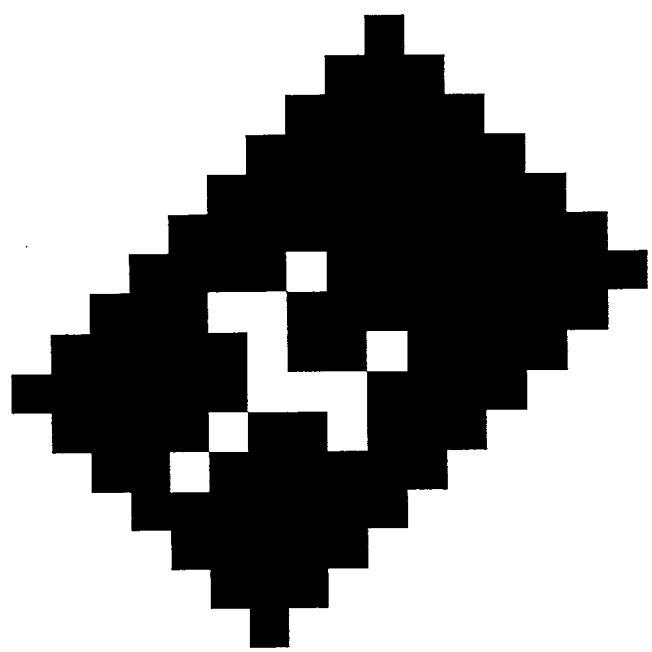

2.4 dB attenuation
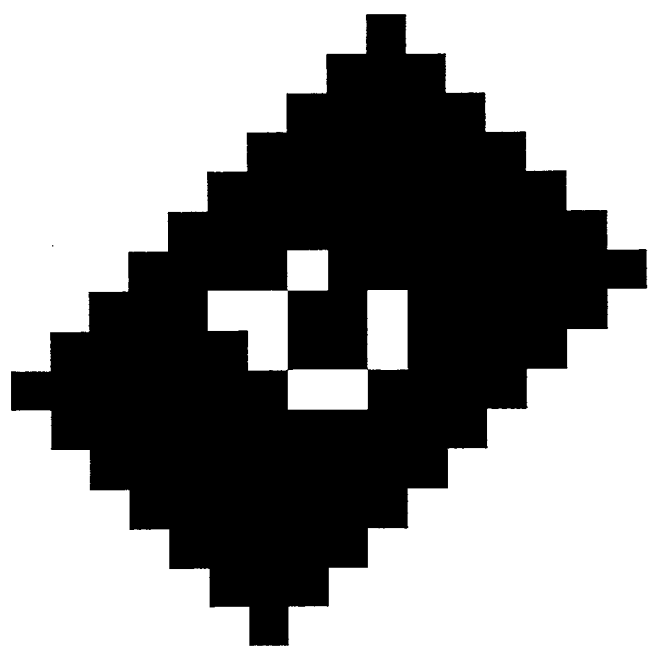

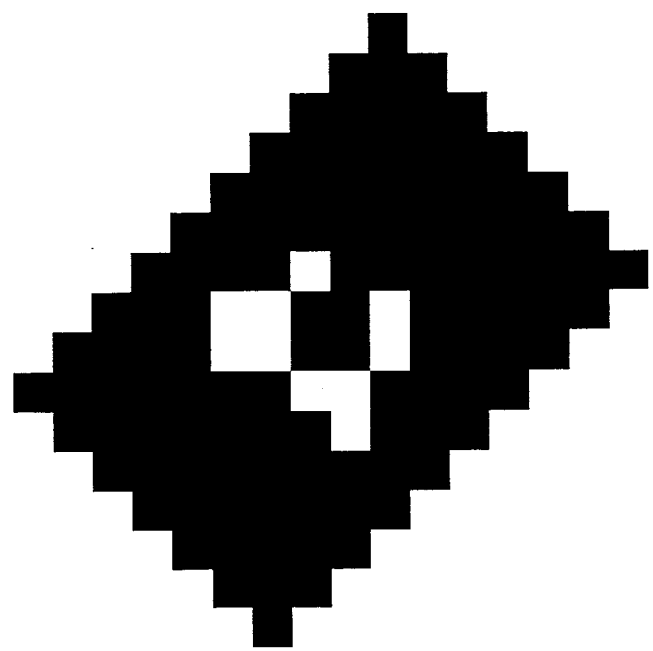

2.8 dB attenuation
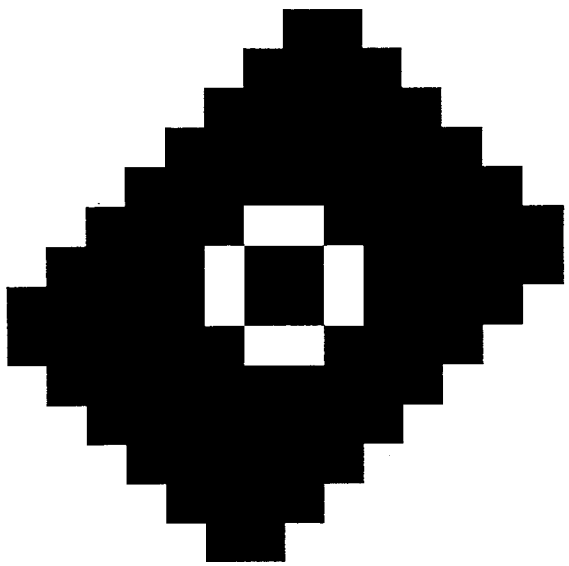

3.0 dB attenuation
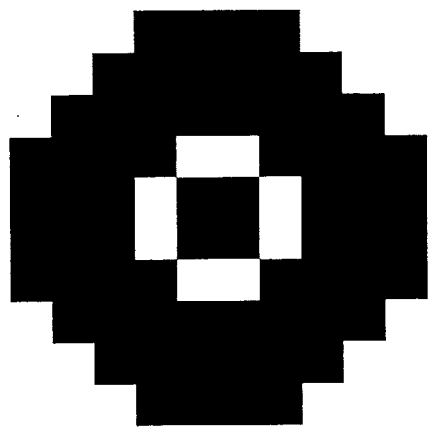

3.2 dB attenuation
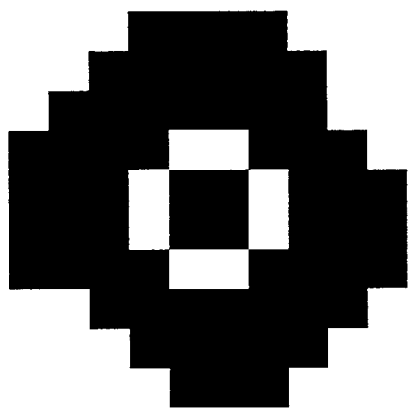

3.4 dB attenuation
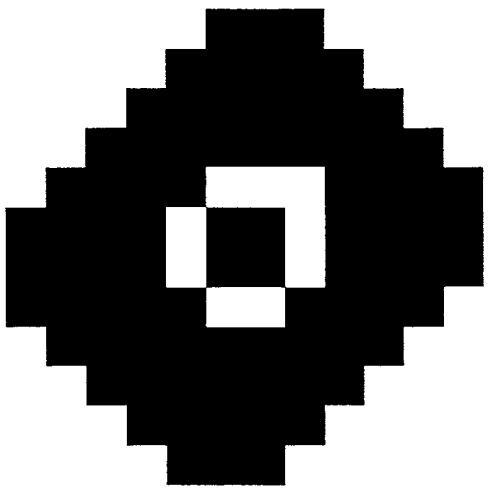

3.6 dB attenuation
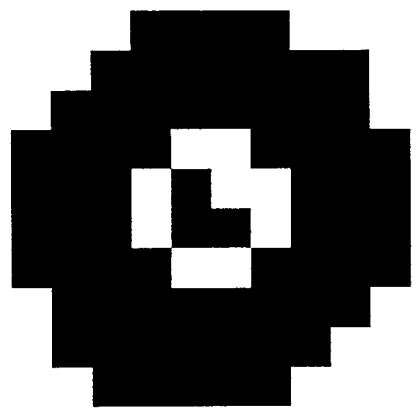

3.8 dB attenuation
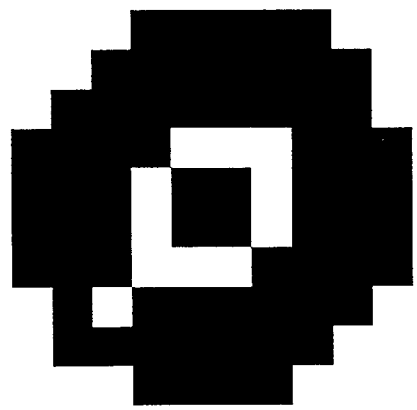

4.0 dB attenuation
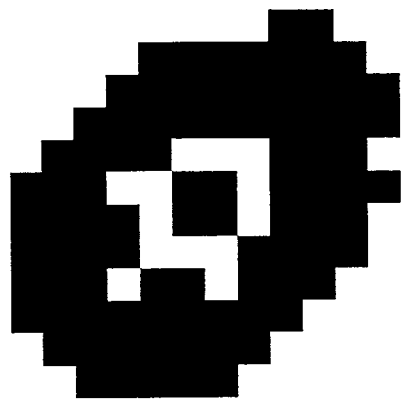

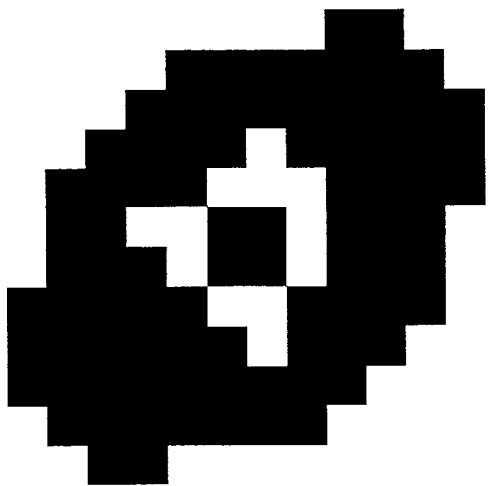
4.2 dB attenuation 4.4 dB attenuation
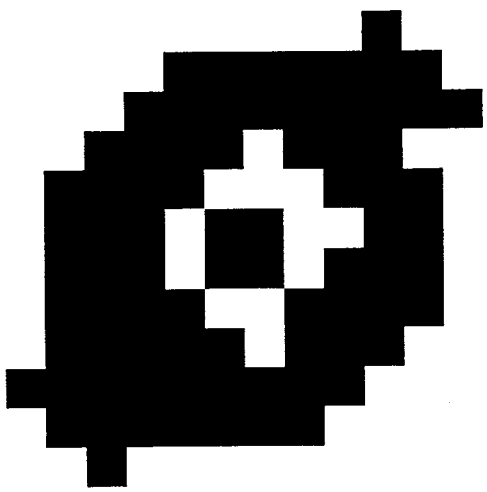

4.6 dB attenuation
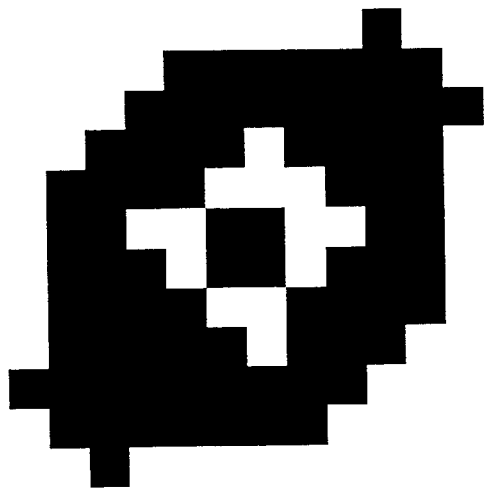

4.8 dB attenuation
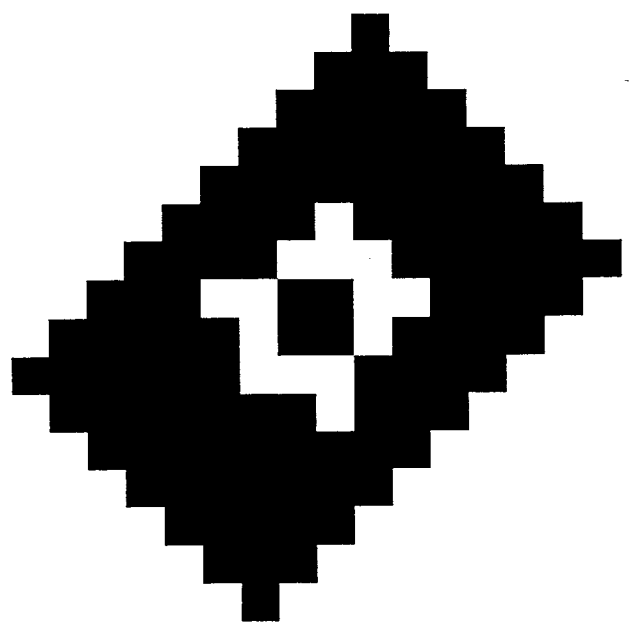

5.0 dB attenuation
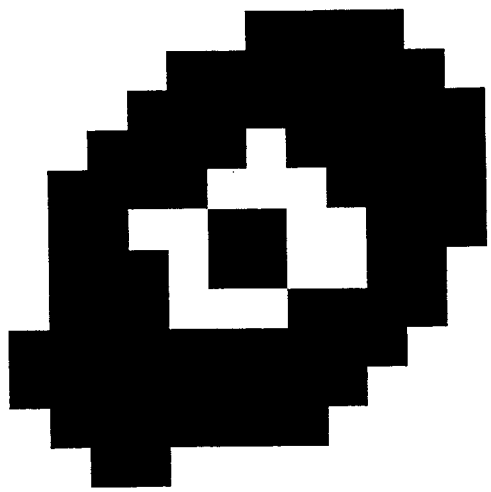

5.2 dB attenuation
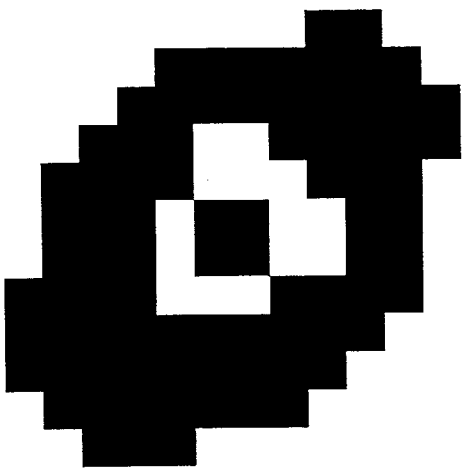

5.4 dB attenuation
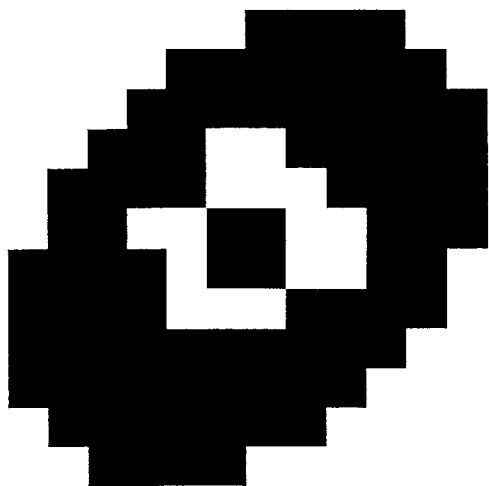

5.6 dB attenuation
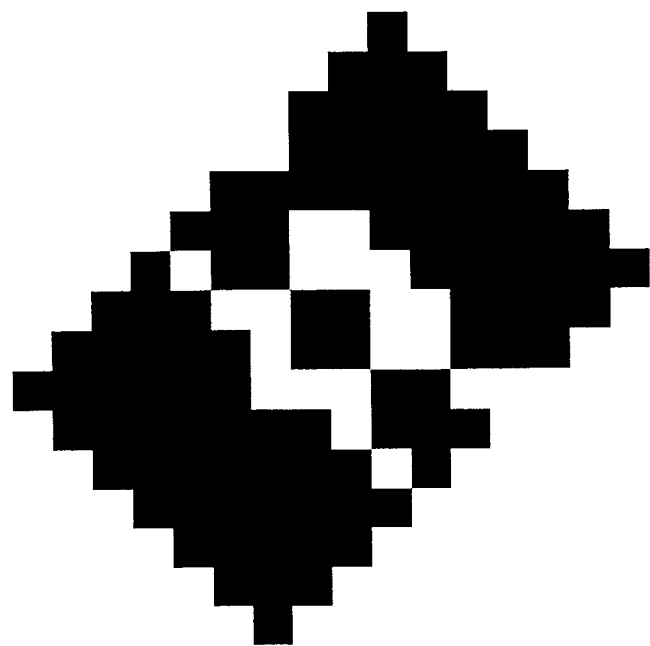

5.8 dB attenuation
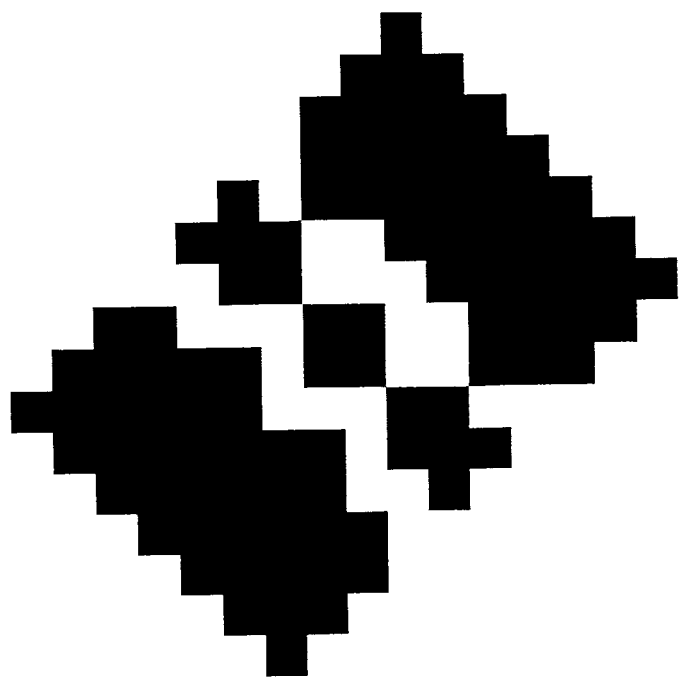

6.0 dB attenuation
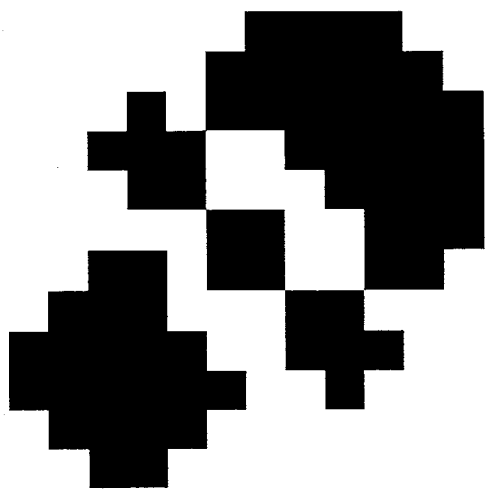

6.2 dB attenuation
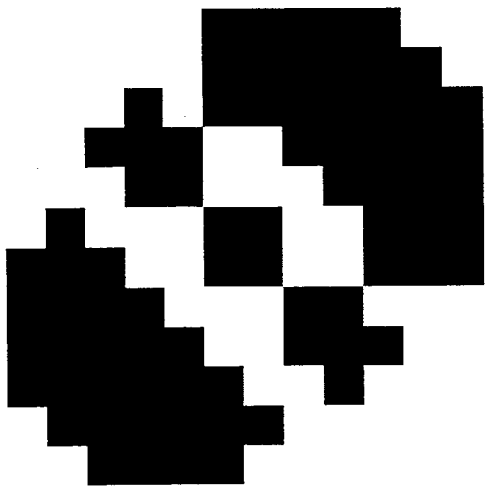

6.4 dB attenuation
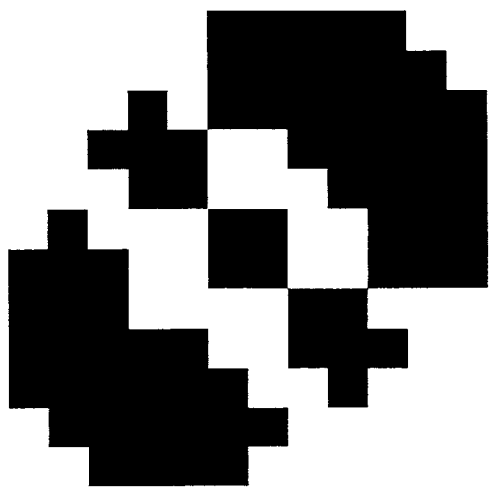

6.6 dB attenuation
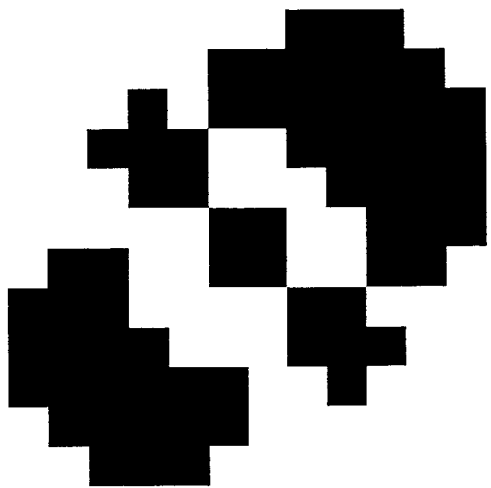

6.8 dB attenuation
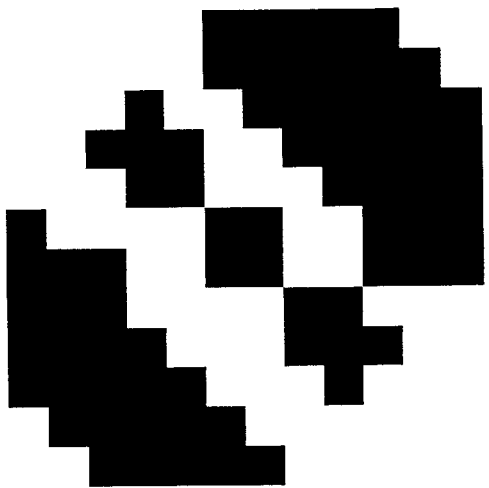

7.0 dB attenuation
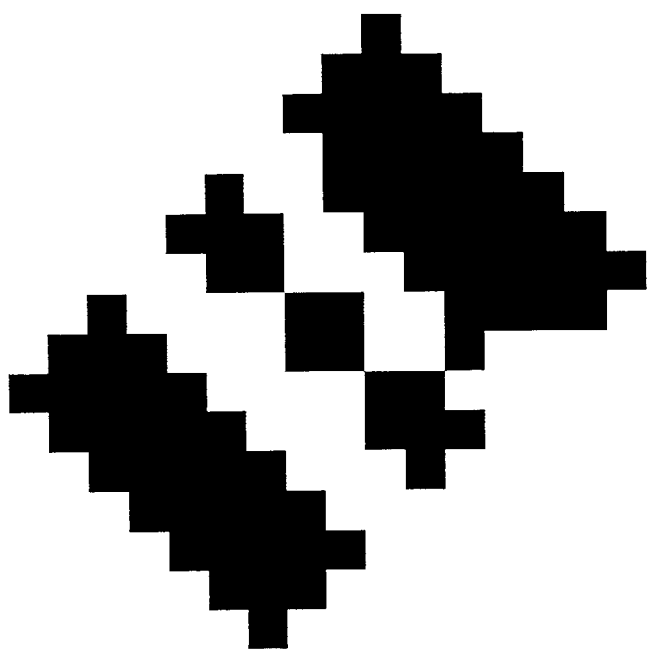

7.2 dB attenuation
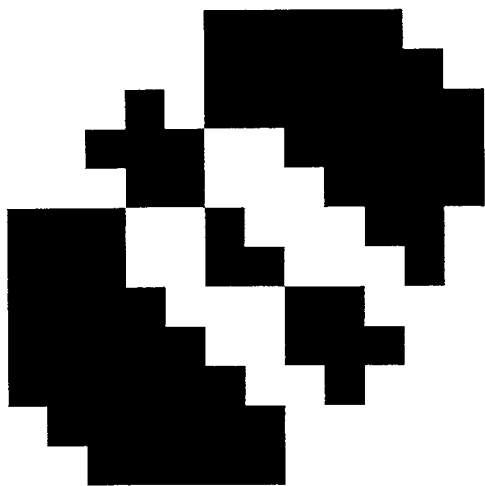

7.4 dB attenuation
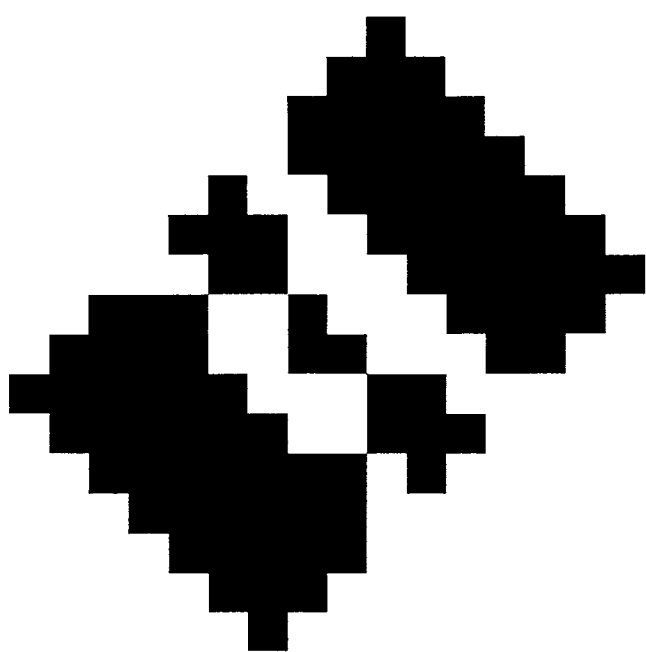

7.6 dB attenuation
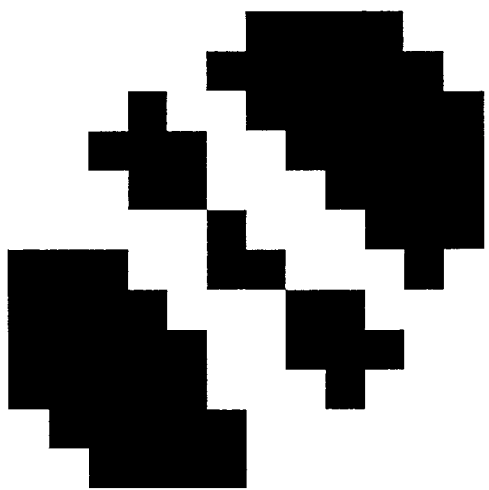

7.8 dB attenuation
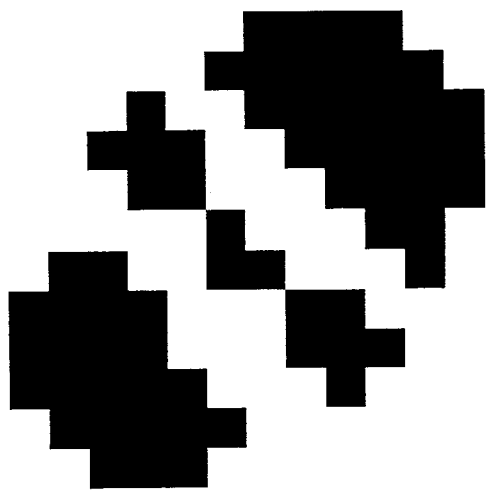

8.0 dB attenuation
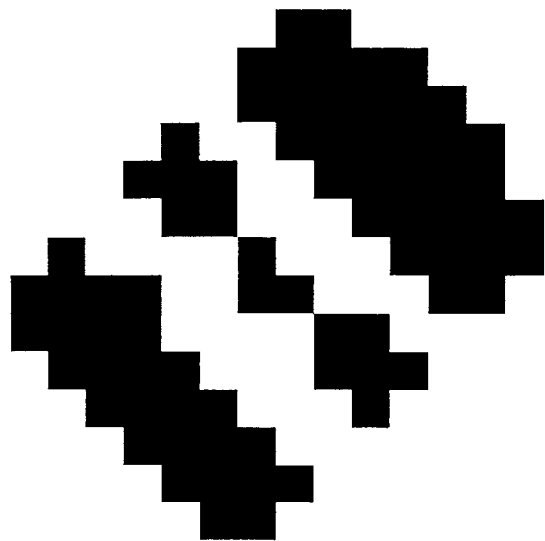

8.2 dB attenuation
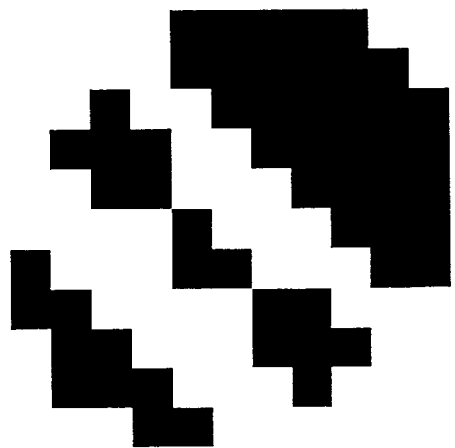

8.4 dB attenuation
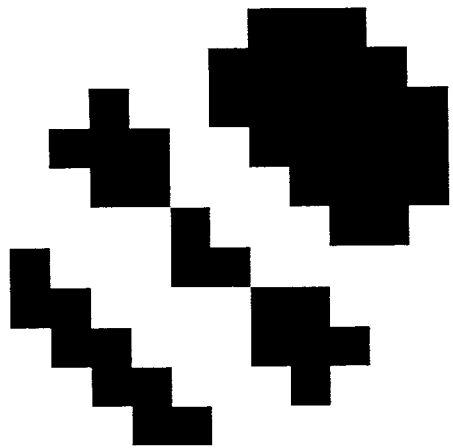

8.6 dB attenuation
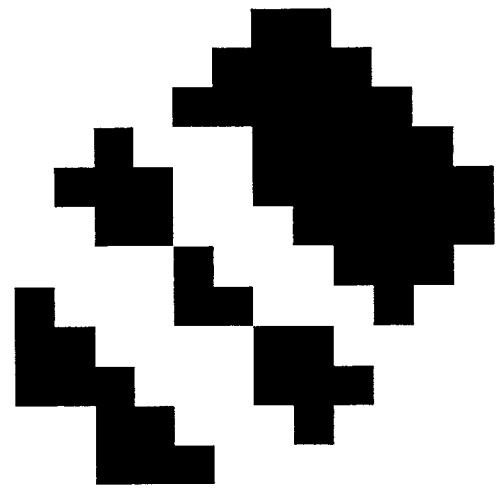

8.8 dB attenuation
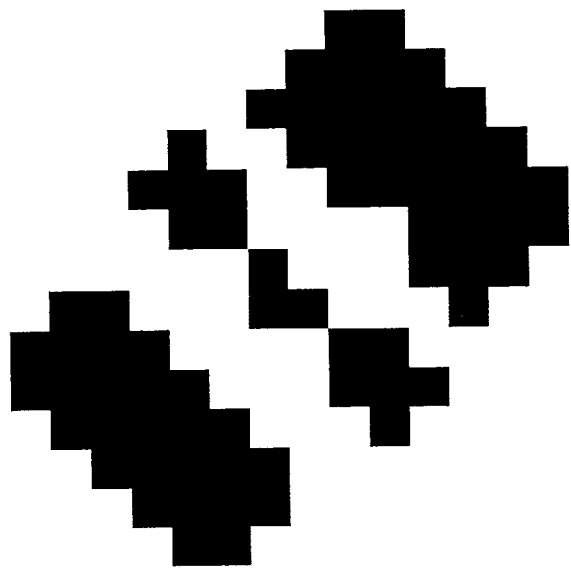

9.0 dB attenuation
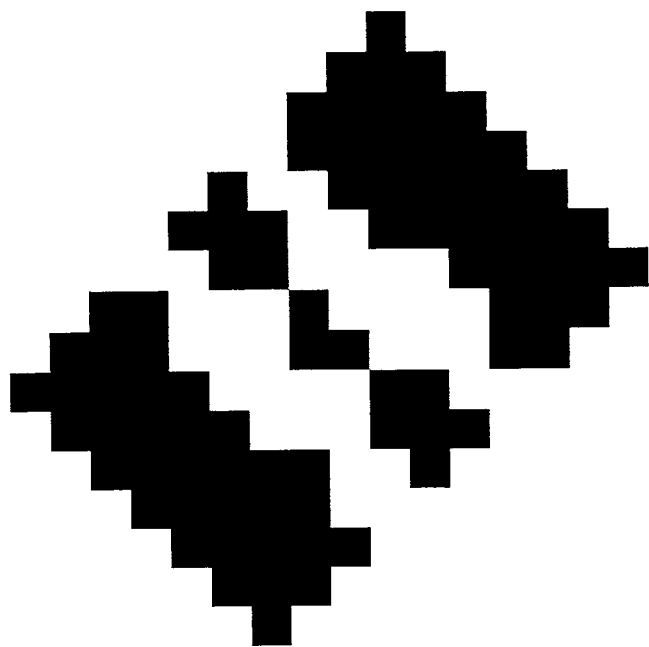

9.2 dB attenuation
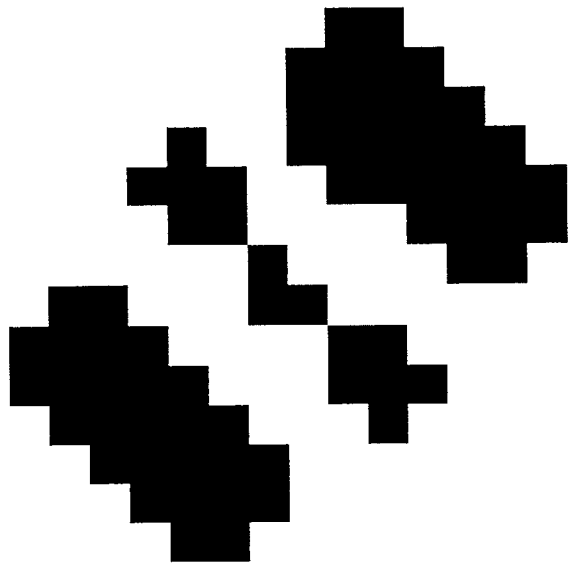

9.4 dB attenuation
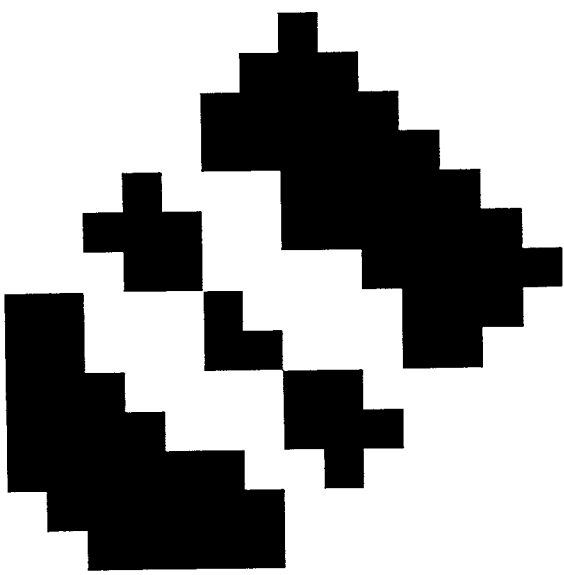

9.6 dB attenuation
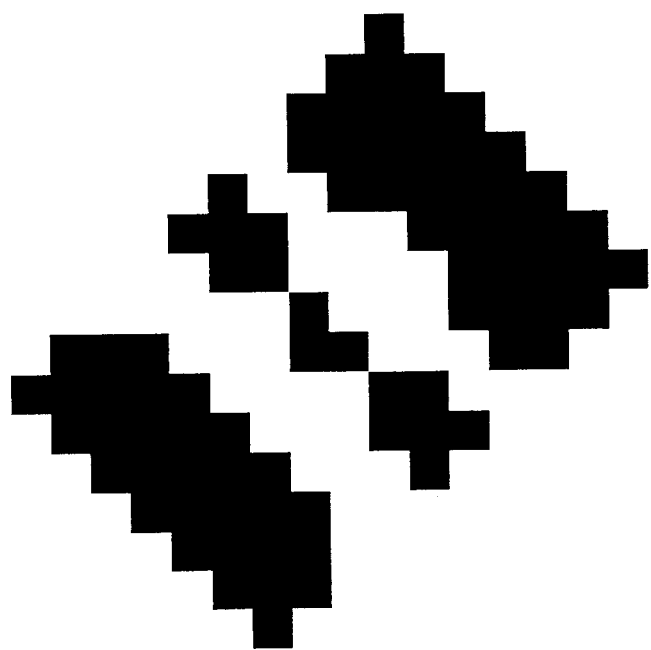

9.8 dB attenuation
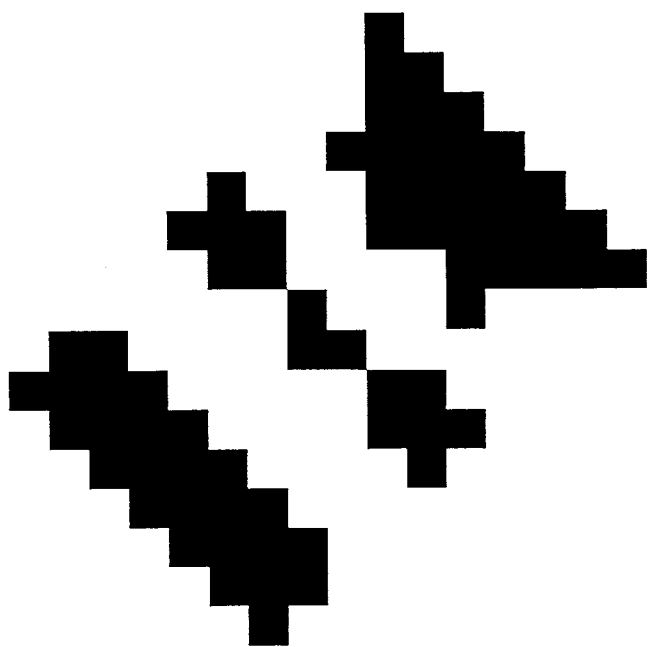

10.0 dB attenuation
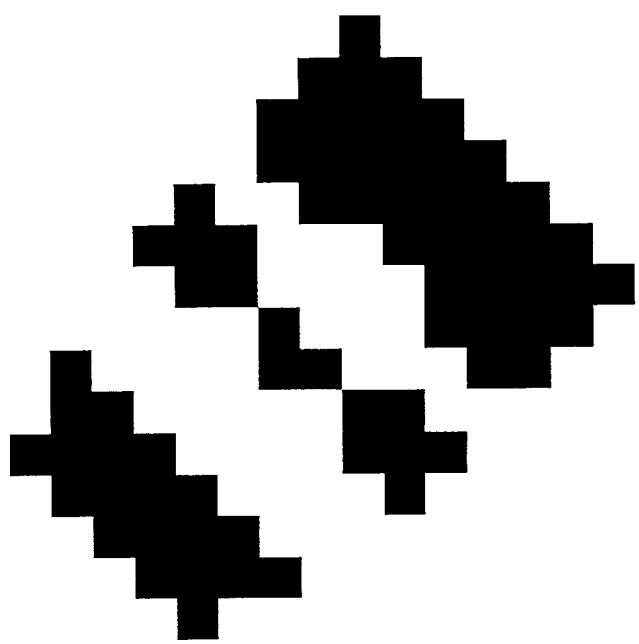

10.2 dB attenuation
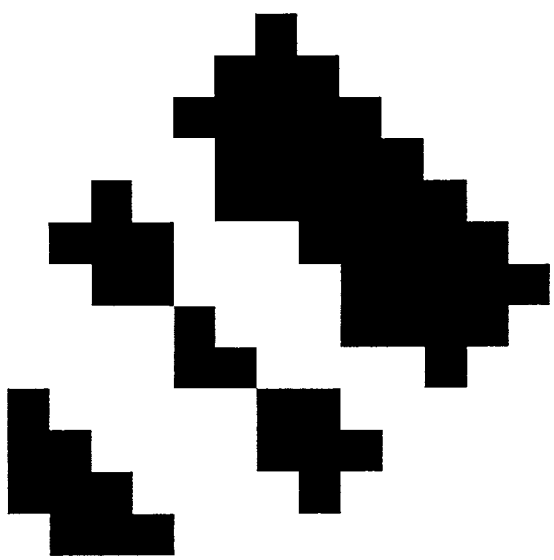

10.4 dB attenuation
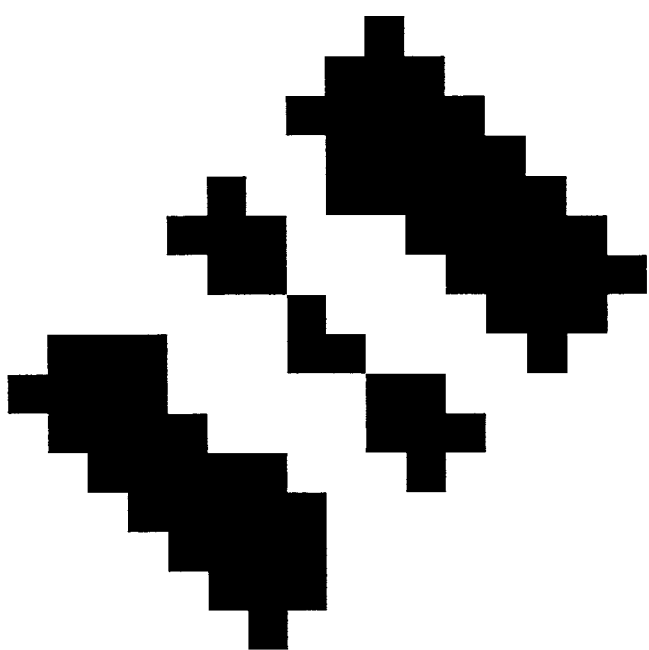

10.6 dB attenuation
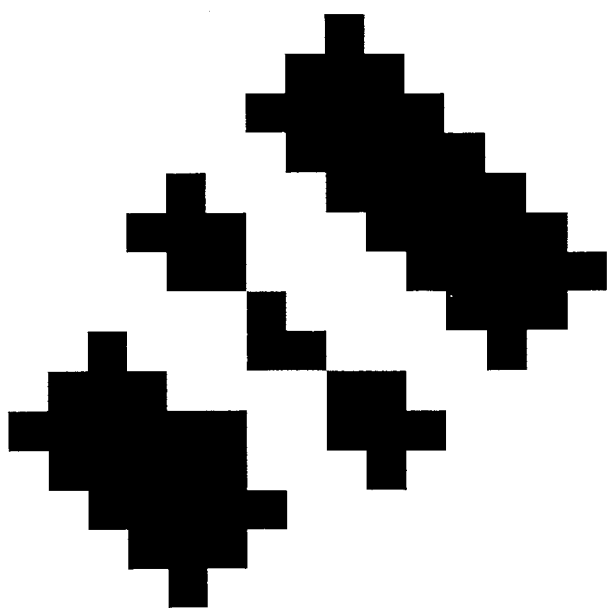

10.8 dB attenuation
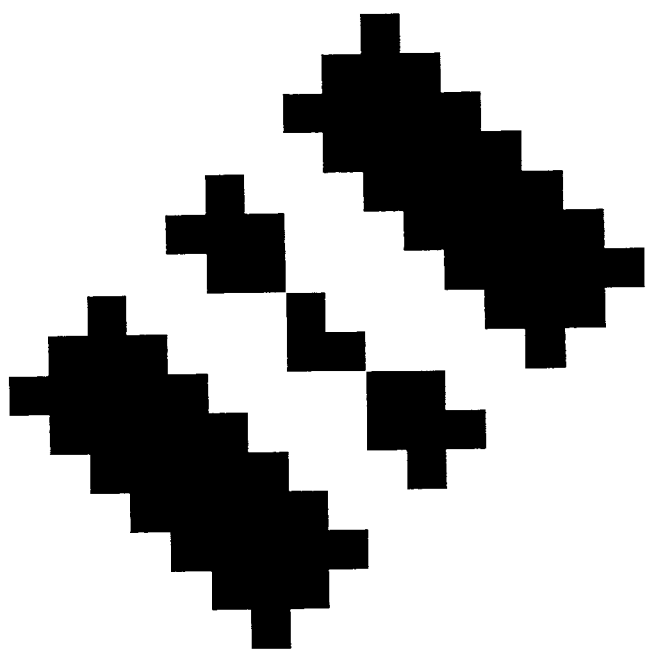

11.0 dB attenuation
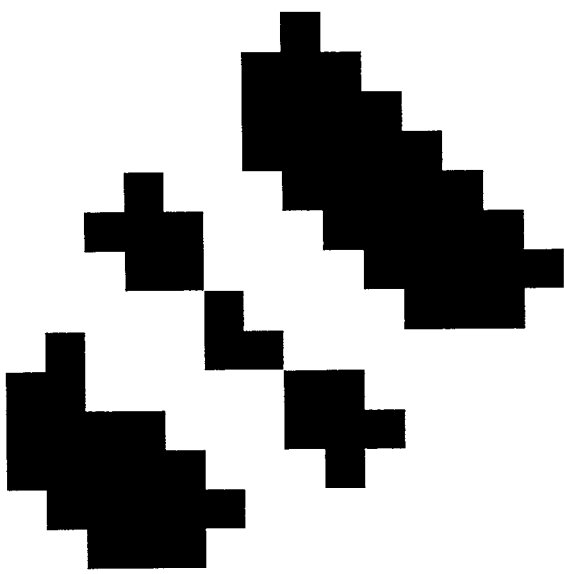

11.2 dB attenuation
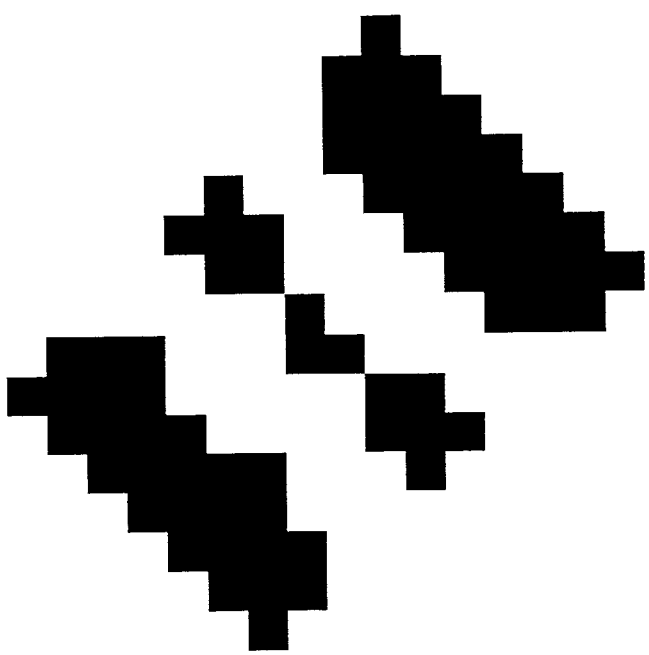

11.4 dB attenuation
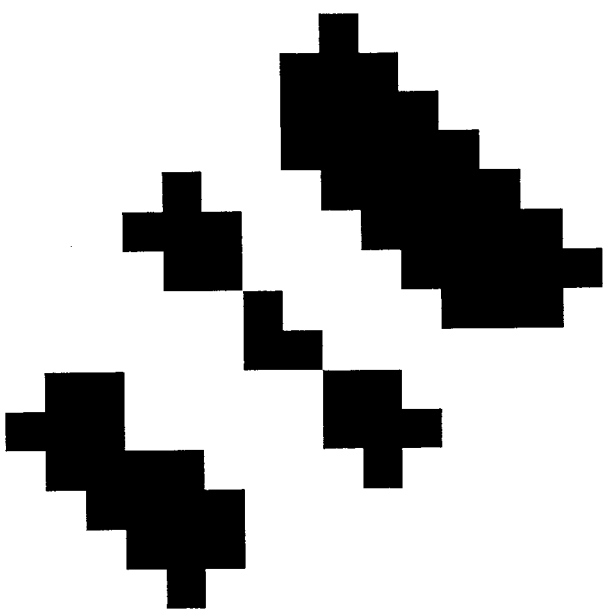

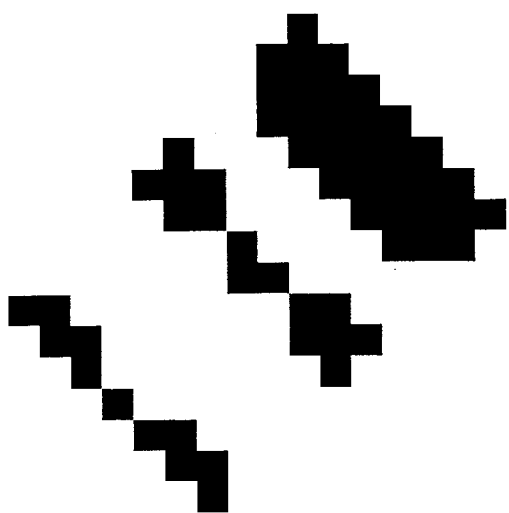
11.6 dB attenuation 11.8 dB attenuation
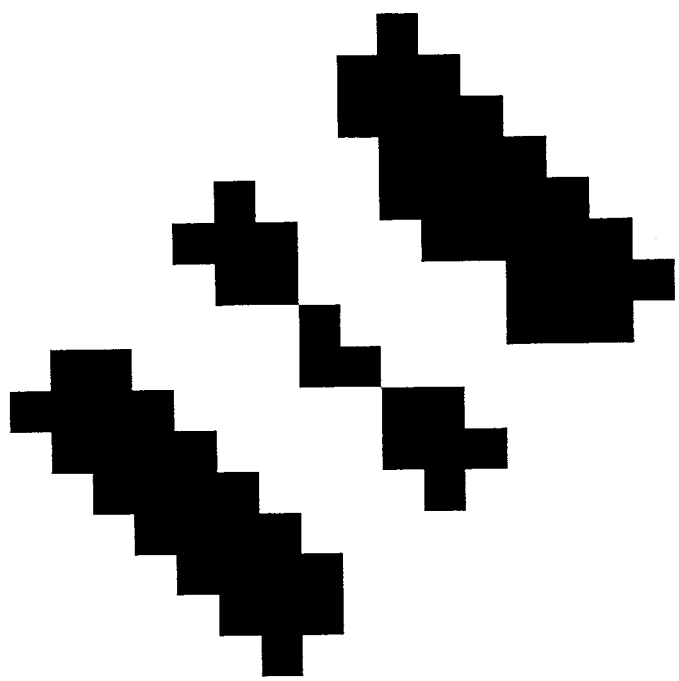

12.0 dB attenuation
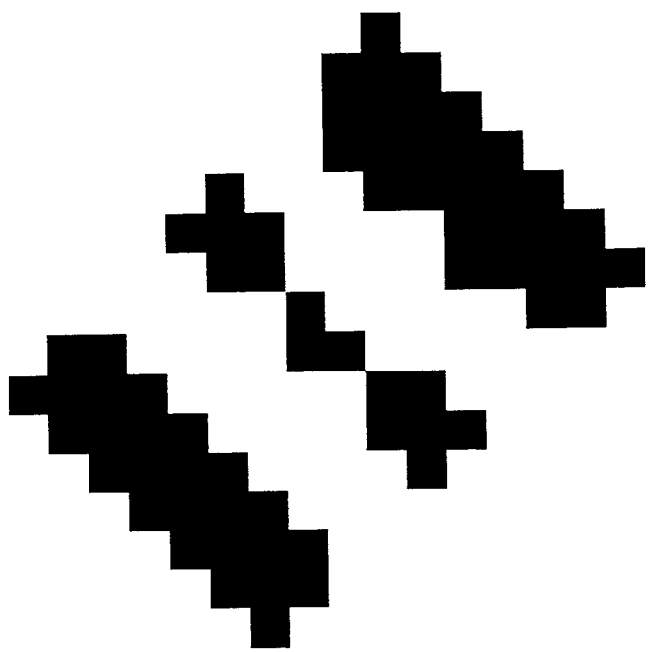

12.2 dB attenuation
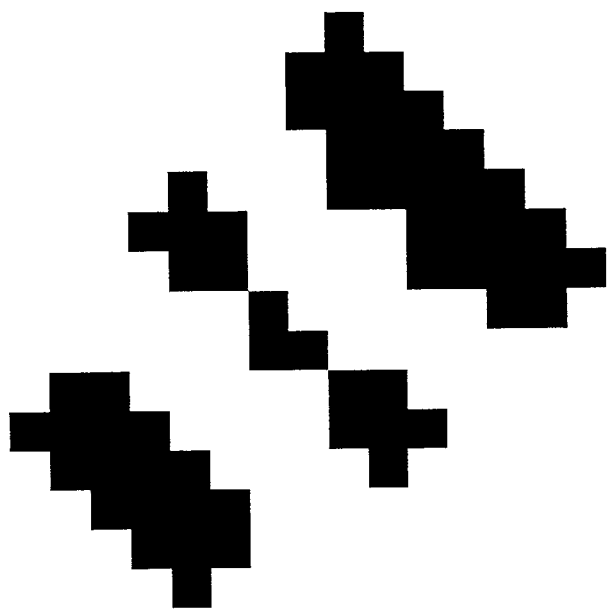

12.4 dB attenuation
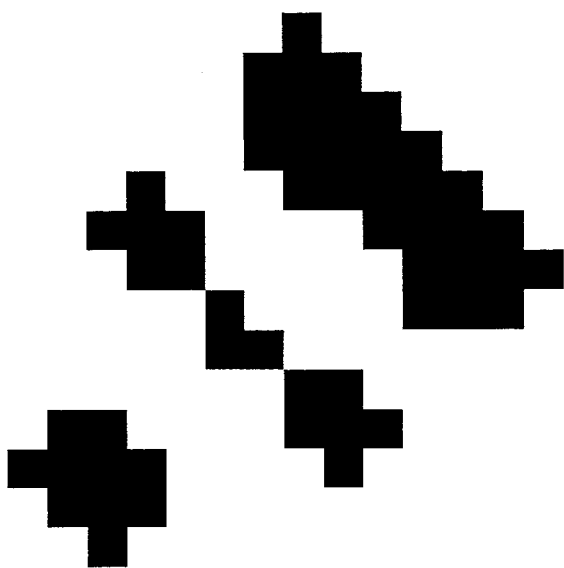

12.6 dB attenuation
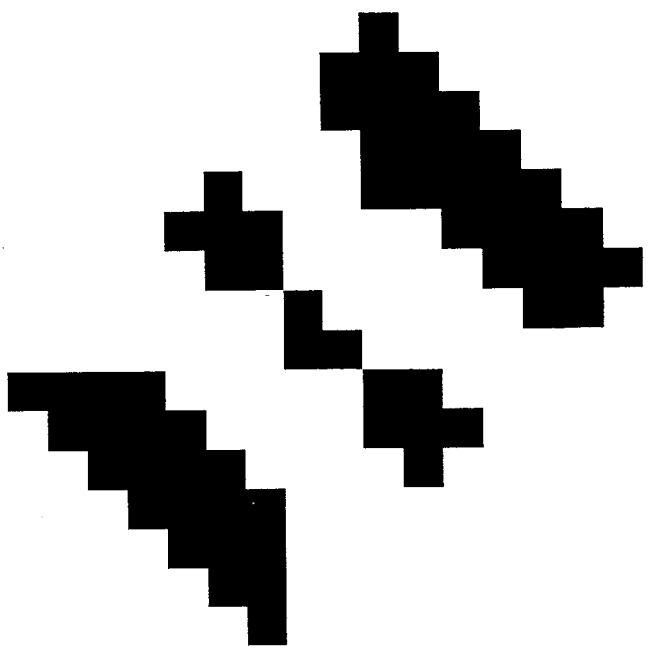

12.8 dB attenuation
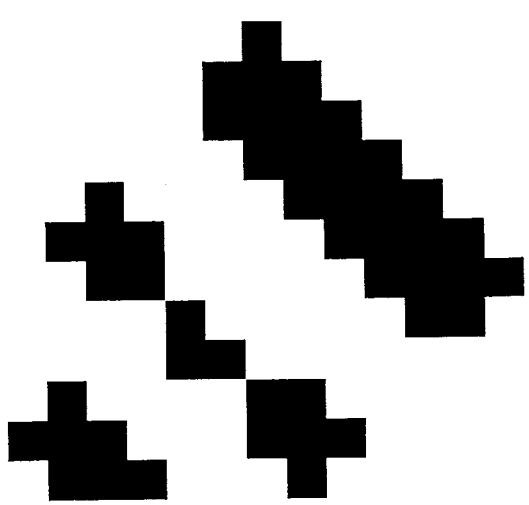

13.0 dB attenuation
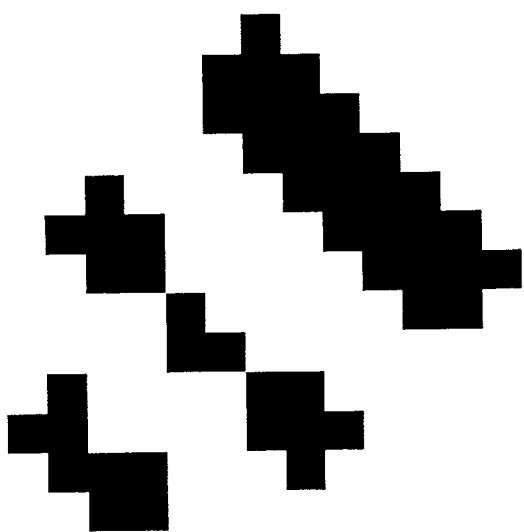

13.2 dB attenuation
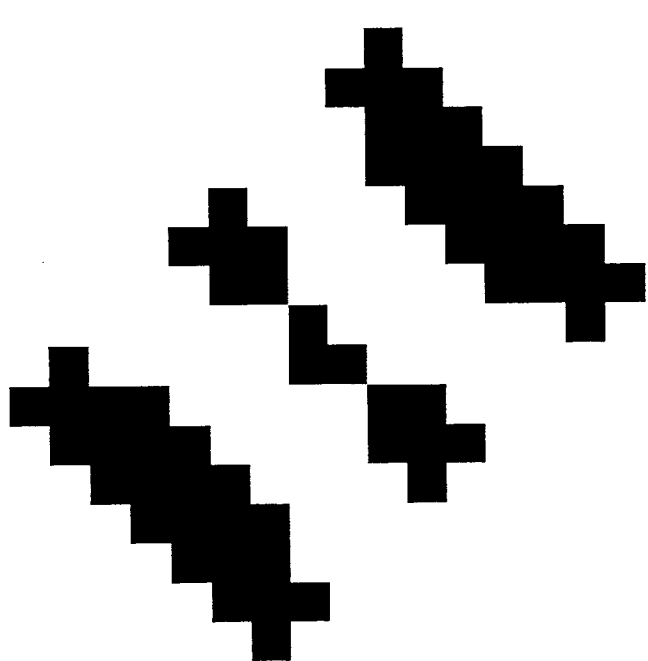

13.4 dB attenuation
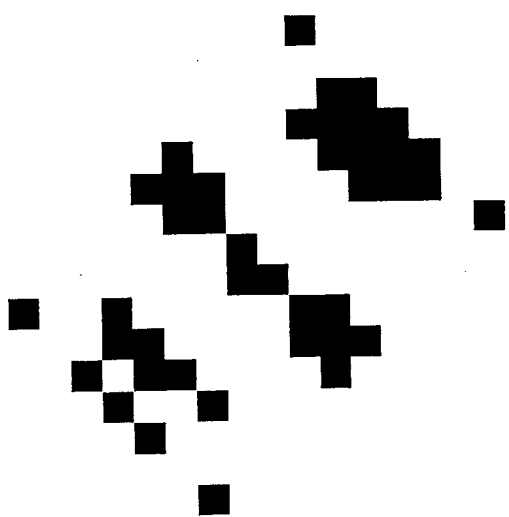

13.6 dB attenuation
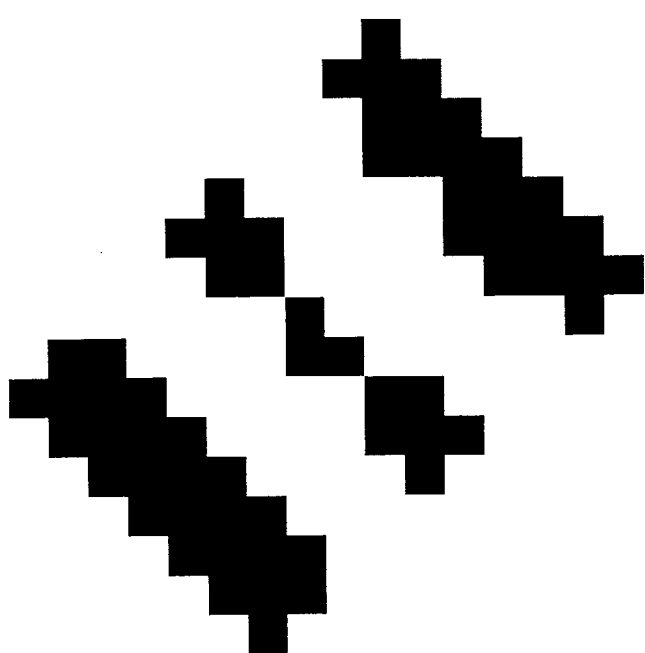

13.8 dB attenuation
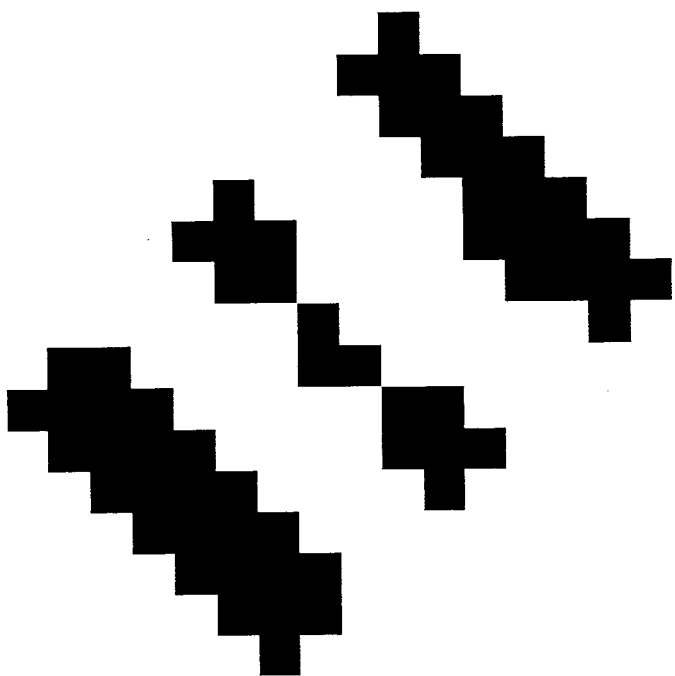

14.0 dB attenuation
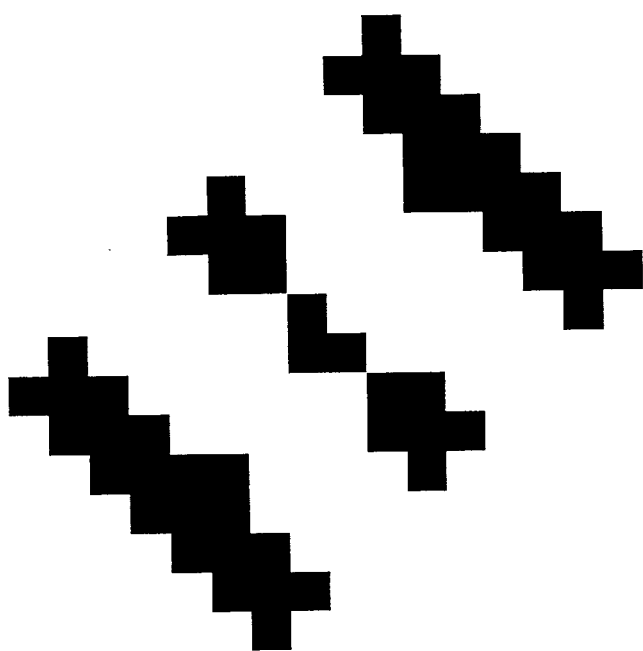

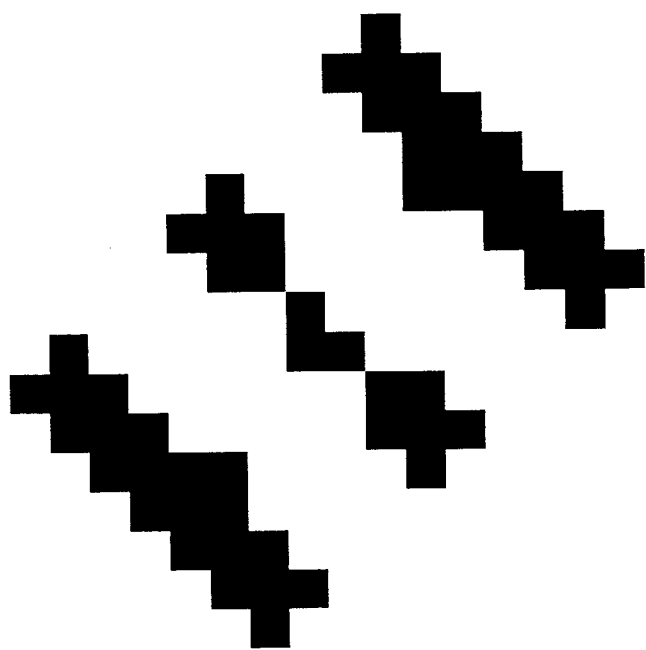

14.0 dB attenuation
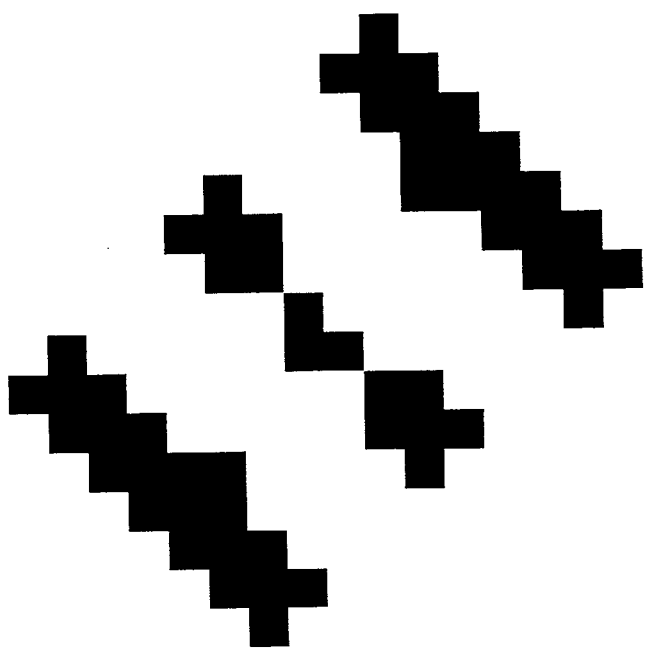

14.0 dB attenuation
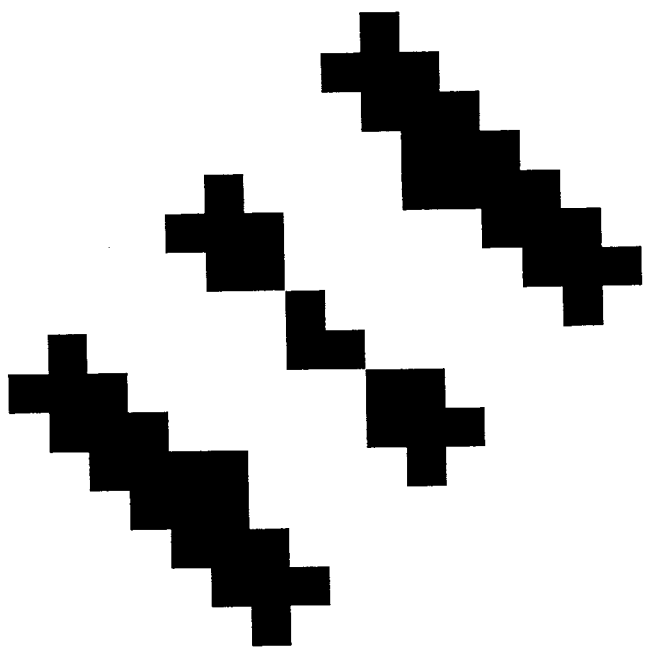

What is claimed is:

1. A method for generating patterns to be used in a spatial light modulator having a plurality of pixels, the method comprising:
   a) generating a pixel pattern to be placed upon the plurality of pixels of the spatial light modulator;
   b) applying the pixel pattern to the pixels of the spatial light modulator;
   c) measuring the optical performance of the plurality of pixels having the pixel pattern applied to it;
   d) comparing the measured optical performance to a target optical performance; and
   e) adjusting the pixel pattern applied to the plurality of pixels to form another optical pattern that more closely achieves the target optical performance.

2. The method of claim 1 wherein the generating of the pixel pattern further comprises:
   a) generating a starting pixel pattern;
   b) estimating the optical performance of the starting pixel pattern; and
   c) adjusting the starting pixel pattern to approximate more closely the target optical performance.

3. The method of claim 2 wherein the estimating of the optical performance of the optical pattern comprises:
   a) illuminating the plurality of pixels with an optical signal;
   b) characterizing the individual optical responses of at least some of the plurality of pixels; and
   c) calculating the estimated optical performance by a calculation based upon the individual optical responses of the at least some of the plurality of pixels.

4. The method of claim 2 wherein the estimating of the optical performance is accomplished by summing, for each pixel, that pixel's off-state response and, for each "on" pixel, a contribution from that "on" pixel.

5. The method of claim 4 wherein the contribution from each "on" pixel is a delta phasor contribution, which is a phasor difference between each individual pixel's on-state response and off-state response.

6. The method of claim 1 and further comprising repeating the measuring of the optical performance and the adjusting of the pixel pattern until the optical performance of the plurality of pixels is within a specified measure from the target optical performance.

7. The method of claim 6 wherein the repetitive adjustments to the pixel pattern causes the optical performance of the plurality of pixels to continually approach the target optical performance from one side of the target optical performance.

8. The method of claim 6 wherein the repetitive adjustments to the pixel pattern causes the optical performance of the plurality of pixels to continually approach the target optical performance, but from either side of the target optical performance.

9. The method of claim 1 wherein the adjusting of the pixel pattern is done according to a pixel sequence map.

10. The method of claim 9 wherein the pixel sequence map defines individual pixels to be turned on sequentially.

11. The method of claim 9 wherein the pixel sequence map defines pixels to be turned on in groups.

12. The method of claim 11 wherein the pixel sequence map contains priority pixels that are left "on" under normal operating conditions.

13. The method of claim 1 wherein the generated pixel pattern comprises a periodically repeating pixel pattern.

14. The method of claim 13 wherein the generated repeating pixel pattern is comprised of a tile of at least two pixels, and wherein the tile of pixels is repeated across the generated repeating pixel pattern.

15. The method of claim 14 wherein the adjusting of the generated repeating pixel pattern comprises changing the pixel pattern of the tile.

16. The method of claim 14 wherein the adjusting of the generated repeating pixel pattern comprises changing pixels within that pattern without applying that change across all tiles, whereby the resulting adjusted repeating pixel pattern is not completely periodic.

17. The method of claim 16 wherein the pixels within the generated repeating pixel pattern are adjusted according to a pixel sequence map.

18. The method of claim 16 wherein the pixel pattern of the tile is changed and wherein individual pixels of the starting periodic optical pattern are adjusted without applying the adjustment to all the tiles.

19. The method of claim 14 wherein the generating of the periodically repeating pattern further comprises:
   a) generating a starting periodic pixel pattern;
   b) estimating the optical performance of the starting periodic pixel pattern;
   c) adjusting the starting periodic pixel pattern to approximate more closely the target optical performance.

20. The method of claim 19 wherein the starting periodic pixel pattern comprises a starting tile of at least two pixels, wherein the tile is repeated across the starting periodic pixel pattern.

21. The method of claim 20 wherein the adjusting of the starting periodic pixel pattern comprises changing the pixel pattern of the starting tile.

22. The method of claim 20 wherein the adjusting of the starting periodic pixel pattern comprises changing pixels within that pattern without repeating those changes across all tiles, whereby the resulting starting periodic optical pixel pattern is not completely periodic.

23. The method of claim 22 wherein the pixels within the starting periodic pixel pattern are adjusted according to a pixel sequence map.

24. The method of claim 23 wherein the pixel sequence map defines individual pixels to be turned on sequentially.

25. The method of claim 23 wherein the pixel sequence map defines pixels to be turned on in groups.

26. The method of claim 25 wherein the pixel sequence map contains priority pixels that are left "on" under normal operating conditions.

27. The method of claim 26 wherein at least some of the priority pixels are grouped in the center of the pattern of pixels, wherein the center priority pixels act as a circular aperture, and wherein the other pixels are manipulated according to the pixel sequence map to cause the plurality of pixels to act as a digital aperture.

28. The method of claim 20 wherein the pixel pattern of the starting tile is changed and wherein individual pixels of the starting periodic pixel pattern are adjusted without repeating the adjustment across all tiles.

29. The method of claim 28 wherein the pixels within the starting periodic pixel pattern are adjusted according to a pixel sequence map.

30. The method of claim 1 wherein the plurality of pixels is logically divided into at least two segments, wherein a single channel optical signal is spread across the at least two logical segments for processing.

31. The method of claim 1 wherein the plurality of pixels is logically divided into at least two segments, wherein at least three channels of an optical signal are distributed across the at least three logical segments for processing.

32. The method of claim 1 wherein the adjusting of the pixel pattern to achieve more closely the target optical performance, includes turning on or off individual pixels within the pixel pattern based on the phasor effects of those individual pixels' optical responses.

33. The method of claim 32 wherein the turning on or off of individual pixels within the pixel pattern is effective to compensate for phasor-based irregularities in an incoming optical signal.

34. The method of claim 33 wherein the phasor-based irregularity is a non-planar incoming optical signal phase front.

35. A method for generating patterns to be used in a spatial light modulator having a plurality of pixels, the method comprising:
   a) generating a pixel pattern to be placed upon the plurality of pixels of the spatial light modulator, the pixel pattern comprising a periodically repeating pattern and non-periodic variations from the periodically repeating pattern;
   b) applying the pixel pattern to the pixels of the spatial light modulator;
   c) measuring the optical performance of the plurality of pixels having the pixel pattern applied to it;
   d) comparing the measured optical performance to a target optical performance; and
   e) adjusting the pixel pattern applied to the plurality of pixels to form another optical pattern that more closely achieves the target optical performance.

36. The method of claim 35 wherein the periodically repeating pattern is confined within a certain area of the pixel pattern.

37. The method of claim 35 wherein the variations from the periodically repeating pattern are interspersed within the periodically repeating pattern.

38. The method of claim 35 wherein the variations from the periodically repeating pattern are outside the periodically repeating pattern.

39. An optical signal processing system comprising:
   a) a spatial light modulator operable to perform optical signal processing on an incoming light signal;
   b) a look-up table operable to store a plurality of pixel patterns to be applied to the spatial light modulator to achieve certain desired optical performance characteristics by the spatial light modulator processing the incoming light signal; and
   c) a processor in electrical communication with the look-up table and the spatial light modulator, the processor operable to generate and apply a pixel pattern to the spatial light modulator, to measure the optical performance of the pixel pattern, to compare the measured optical performance to a target optical performance, and to adjust the pixel pattern to more closely achieve the target optical performance.

* * * * *